United States Patent [19]
Bates et al.

[11] Patent Number: 5,211,566
[45] Date of Patent: May 18, 1993

[54] DOCKING CONNECTOR FOR DISK DRIVES

[75] Inventors: Warren A. Bates, Winston Salem; Frederick R. Deak, Kernersville; David C. Johnson, Winston Salem; Robert M. Renn, Pfafftown; Keith L. Volz, Jamestown, all of N.C.

[73] Assignee: AMP Incorporated, Harrisburg, Pa.

[21] Appl. No.: 929,185

[22] Filed: Aug. 11, 1992

[51] Int. Cl.⁵ .................... H01R 13/629; H01R 23/70
[52] U.S. Cl. ........................................ 439/66; 439/67; 439/138; 439/260; 439/326; 439/377; 439/653; 439/840; 439/928; 439/936
[58] Field of Search ..................... 439/59–62, 439/67, 76, 77, 136, 138, 142, 259, 260, 261, 267, 326, 342, 376, 377, 493, 840, 927, 928, 936, 66, 638, 650, 653

[56] References Cited

U.S. PATENT DOCUMENTS

| | | | |
|---|---|---|---|
| 4,185,882 | 1/1980 | Johnson | 439/326 |
| 4,200,349 | 4/1980 | Holland | 439/326 |
| 4,462,657 | 7/1984 | Snowdon et al. | 439/840 |
| 4,810,203 | 3/1989 | Komatsu | 439/377 |
| 4,969,824 | 11/1990 | Casciotti | 439/637 |
| 5,061,191 | 10/1991 | Casciotti | 439/840 |

Primary Examiner—Neil Abrams
Attorney, Agent, or Firm—William B. Noll

[57] ABSTRACT

A docking assembly including a guide housing (2) and camming assembly (38, 54 and 40) for mechanically interfacing a modular component (46) with a circuit board to thereby complete and protect multiple electrical connections therebetween. An interfacing connector (80) is also disclosed for providing an electrical and mechanical interface between a circuit board and a disk drive (82). The interfacing connector (80) allows high-density multiple electrical interconnections to the circuit board by the use of canted coil springs (100) for direct electrical contact with individual traces and/or contact pads on the circuit board. The interfacing connector (80) may also include a docking assembly (130) with guide channels (136) for guiding insertion of a circuit board to thereby insure the integrity of the electrical interconnections therebetween.

23 Claims, 30 Drawing Sheets

DOCKING CONNECTOR FOR DISK DRIVES

FIELD OF THE INVENTION

The present invention relates to the electrical and mechanical interfacing of a circuit board with a disk drive and, in particular, to a docking connector for completing a multiple-electrical-connection interface between a disk drive and a mother board.

BACKGROUND OF THE INVENTION

Electrical circuit board technology is rapidly evolving toward smaller components and increased density of conductive traces. To keep pace, the connector interfaces must likewise be reduced in size and provide higher density points of electrical contact. At the same time, the precision of such connectors must be dramatically increased to insure the integrity of the resulting electrical connections. In fact, the spacing of traces and contact pad centers on contemporary circuit boards are now on the order of less than 0.020 inches. Such dimensions command precision-manufactured parts and accurate alignment features.

Great difficulty exists in manufacturing and assembling the necessary connector parts such as contact springs which can provide high-density points of contact while insuring reliable low-resistance electrical connections. The problems are compounded by additional design considerations such as minimizing the necessary insertion force.

U.S. Pat. Nos. 4,969,824 and 5,061,191 address the foregoing problems by employing a flexible printed circuit film strip with contact pads for electrically contacting an adjoining circuit board, and an underlying housing containing elongated coil springs which press the film strips and their contact pads against the appropriate point on the printed circuit board. The coil springs disclosed therein facilitate a high density array of stable low-resistance electrical contacts.

It would be greatly advantageous if comparable coil spring contacts could be incorporated in an edge-type connector. This would allow high-density interfacing of a circuit board to modular components such as a disk drive. However, this would additionally require an improved mechanical interface to accommodate slidable insertion of the circuit board over the coil springs.

SUMMARY OF THE INVENTION

It is, therefore, an object of the present invention to provide a docking connector for electrically and mechanically connecting a modular component such as a disk drive to a circuit board.

It is an additional object to incorporate canted coil spring contacts in a docking connector as described above for completing multiple high-density electrical connections with a circuit board.

It is another object of the invention to provide a docking connector which facilitates slidable insertion of a modular component such as a disk drive into a fully-seated position, and like slidable insertion of a circuit board into a fully-seated position to thereby connect the disk drive and circuit board.

It is still another object of the invention to provide a pivoting cover for protecting the interior of the docking connector in the absence of a circuit board, and additionally, for biasing the circuit board against the coil springs when inserted.

It is a further object of the invention to provide a self-aligning docking connector assembly to facilitate insertion of a disk drive and a mother board.

In accordance with the above-described objects, the present invention provides a docking connector for mechanically interfacing a circuit board and a modular component such as a disk drive. The docking connector includes a guide housing formed as an open-ended enclosure. The enclosure has a first end for slidable insertion of the modular component, and a second end for slidable insertion of the edge of the circuit board. The guide housing further includes interior alignment means for guiding insertion of the modular component such that its contact terminals are brought into a facing spaced-apart relation with the appropriate traces along the circuit board edge. The connector also includes a camming assembly which is pivoted at the first end of the guide housing for manipulating the modular component to thereby bring its contact terminals into electrical contact with the traces of the circuit board, thereby completing an electrical interface between the circuit board and the modular component.

The invention also encompasses an interfacing connector for providing an electrical as well as a mechanical interface between a circuit board and a modular component such as a disk drive. The interfacing connector includes a connector housing having a first ingress for insertion of a printed circuit board, a second ingress to allow coupling of a modular component, and a transverse support shelf extending between the first ingress and second ingress. A plurality of conductive terminals are arranged within the second ingress of the connector housing along the shelf for completing a multiple-electrical-connection interface with the modular component. In addition, a plurality of canted coil springs are arranged linearly within the first ingress of the connector housing along the shelf. Each spring is connected to a corresponding one of the conductive terminals. To employ the interfacing connector, it may be connected at the second ingress to the disk drive, and the circuit board may be inserted into the open first ingress of said connector housing along the shelf to bring the canted coil springs into conductive contact at an appropriate point on the circuit board. In this manner, an electrical interface is completed between the circuit board and the disk drive.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT(S)

Figure 1:
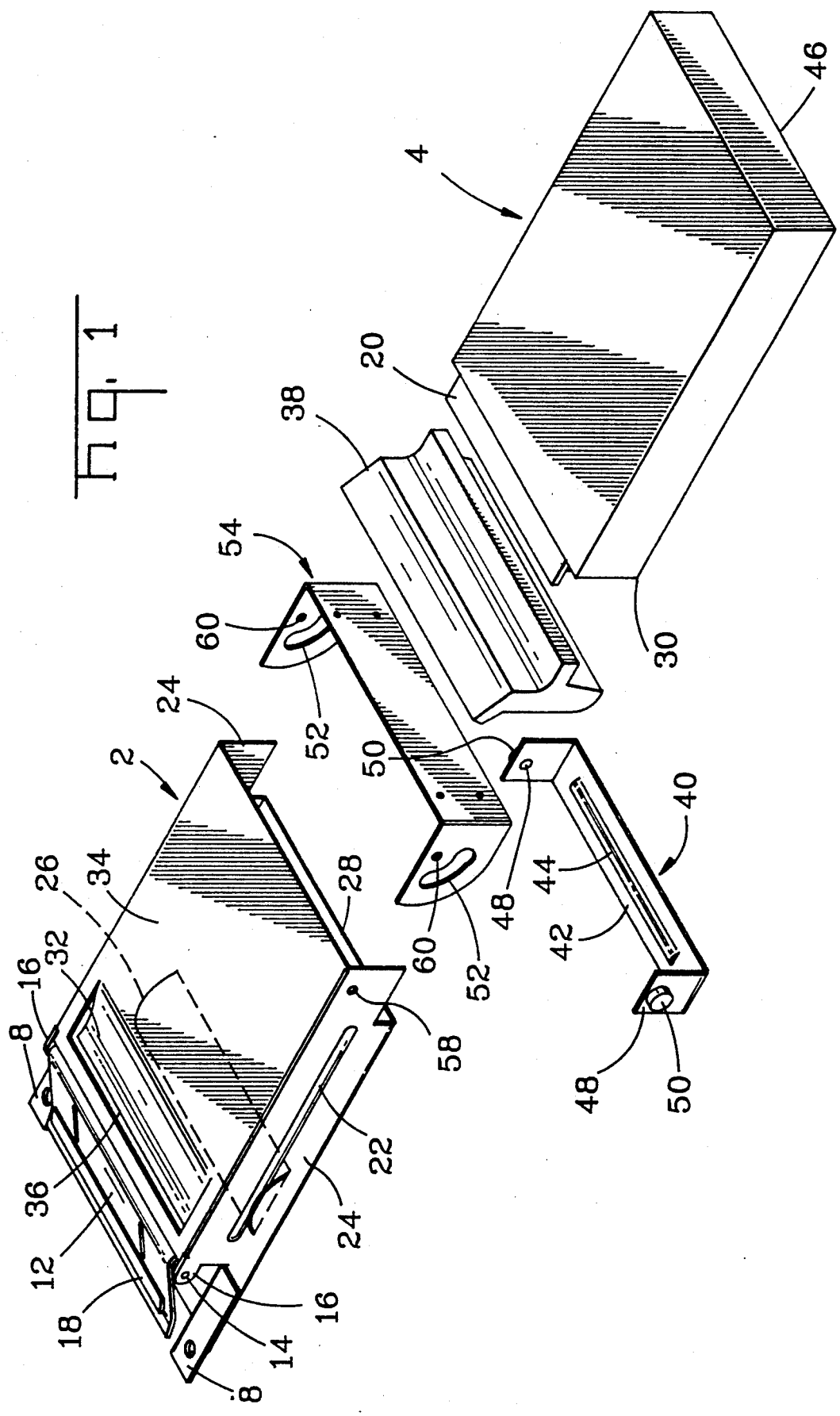
FIG. 1 is an isometric exploded view of a docking connector according to one embodiment of the present invention
Figure 2:
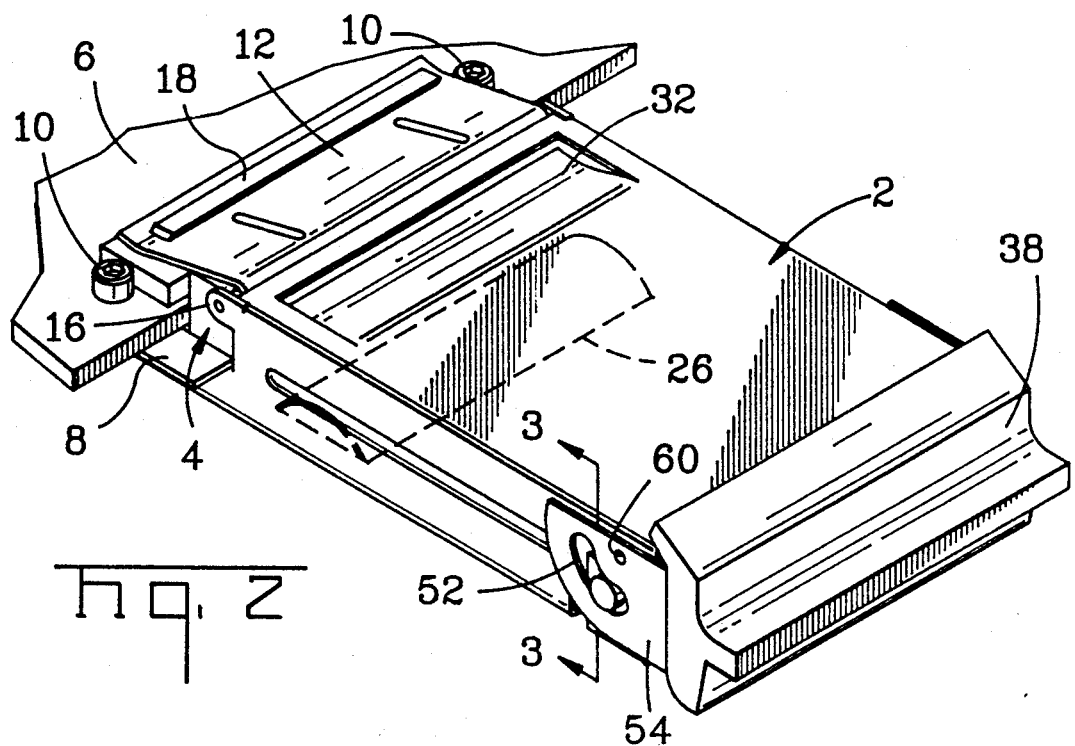
FIG. 2 is an assembled isometric view of the components of FIG. 1.

Referring to FIGS. 1 and 2, a guide housing 2 is formed of sheet metal or the like into a basically rectangular box-like structure. Guide housing 2 serves to linearly guide a modular component such as a conventional hard disk drive 4 into engagement with a fixed printed circuit mother board 6. Housing 2 has a pair of outwardly directed mounting ears 8 at an end facing the mother board 6 for rigid connection to the mother board via mounting fasteners 10. This absolutely locates the guide housing 2 relative to the circuit traces on the mother board.

Figure 4:
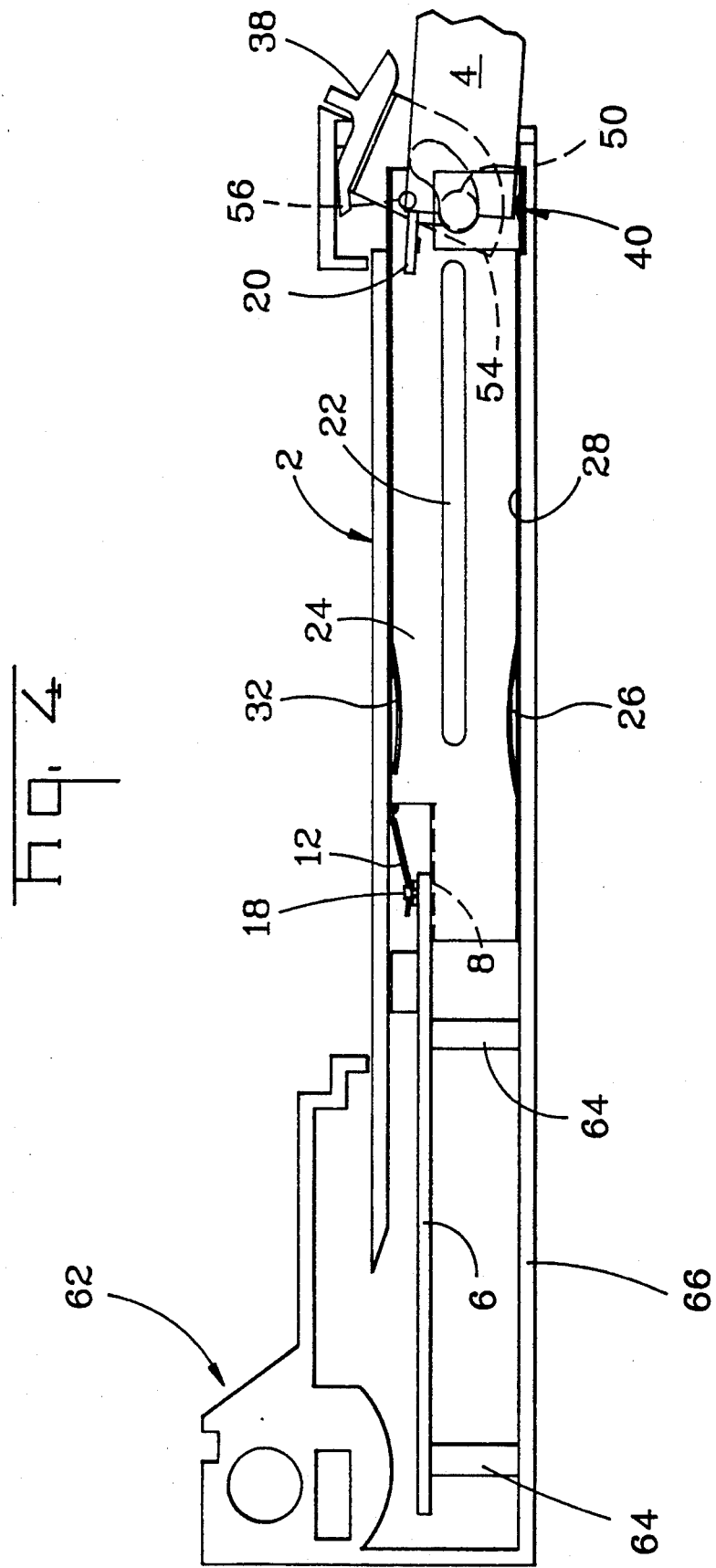
FIG. 4 is a cross-sectional view of a small computer showing the area in which a removable hard disk drive would be received, including means for directing the hard disk drive (46) into alignment with the mother board of the computer.

The housing 2 could also be secured to the floor of the computer housing as shown in FIG. 4.

Housing 2, on the same end as the mounting ears 8, also contains a protective cover 12 which is fixed for rotation about a pivot pin 14, pin 14 in turn being mounted between supporting ears 16 which extend from the sidewalls of housing 2. This cover 12, by force of gravity, overlies the contact area of the mother board and its associated compressive members (which, for example, may be canted coiled springs, ampliflex or any other type compressive connector).

The cover 12 may contain a felt insert 18 saturated with a cleaning solvent to maintain clean contacts. Either Way, the cover 12 will protect the contact surfaces from dust contamination. Upon insertion of a device 4, the cover 12 is lifted upwardly by the printed circuit board 20 of the device to permit the board 20 to come in between the cover 12 and the mother board 6 for subsequent interconnection therewith. (See FIGS. 4-10.)

The guide housing 2 is dimensioned across its width to receive and guide the device 4 linearly. A detent 22 in each sidewall 24 aids in maintaining the device 4 in linear alignment.

Means for controlling the vertical movement of the device 4 is also provided in the guide housing 2. A rigid protrusion 26 is bent up from the floor 28 of the housing 2 to engage the lower leading edge 30 of the device 4 to urge said device in an upward direction when it reaches that position during its insertion. The device 4 is urged upwardly against a compliant guide 32 which is formed inwardly from the top 34 of the housing 2. This guide is free ended as shown at 36 to permit it to flexibly urge the device 4 in a downwardly direction but yielding to the rigid guide 26. The two guides 26 and 32 cause the printed circuit board end of the device to raise to a position of clearance relative to the mother board 6 during its insertion. As will be apparent below, the compliant guide 32 also supplies the downward force needed when the device is raised on its rear end by the closing of the door 38.

The action of a lifting mechanism 40 provided to raise the rear end of the device 4 when electrical contact to the mother board is desired. Lifter 40 has a floor area 42 with a linear embossment 44 which engages the bottom of the end 46 of the device 4. (See FIG. 3). A pair of upstanding walls 48 extend from the floor 42 and contain fixed pins 50 for engagement in a cam track 52 on a member 54 which is rigidly mounted to the door 38. Camming member 54 and door 38 are pivotally connected to the sidewalls 24 of housing 2 via pivot pins 56 (see FIGS. 4–8) fixed for rotation in holes 58 in housing 2 and holes 60 in a camming member 54.

Figure 3:
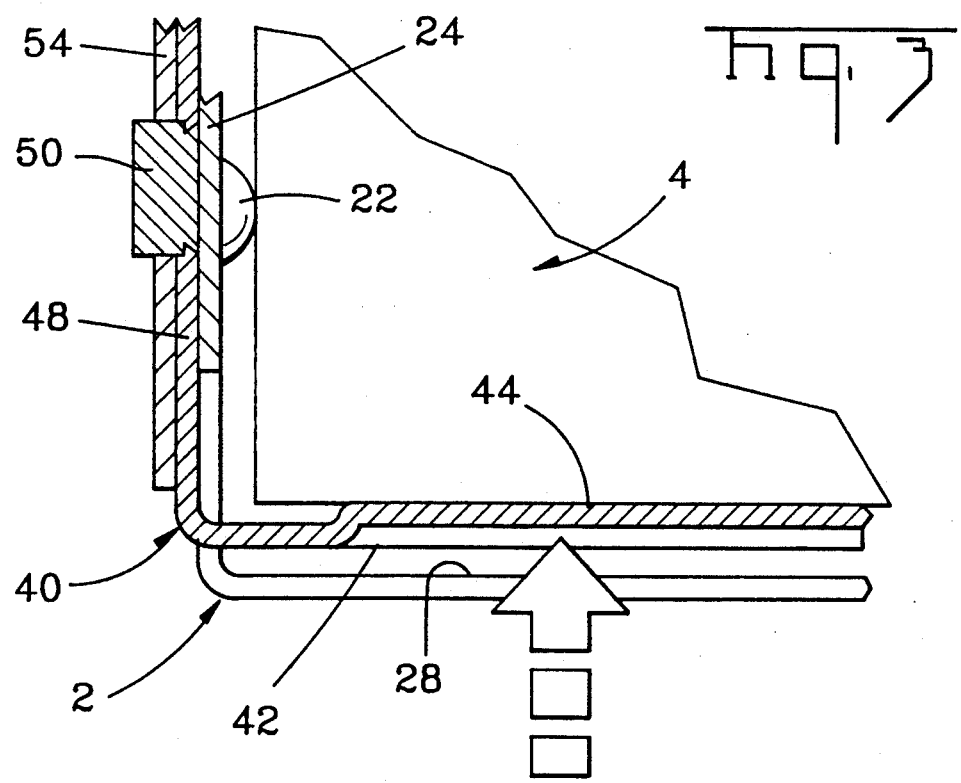
FIG. 3 is a fragmentary cross-sectional view taken substantially along the lines 3—3 of FIG. 2 and shows the camming assembly (38, 54 and 40) which causes the downward movement of the inserted modular device (46)
Figure 8:
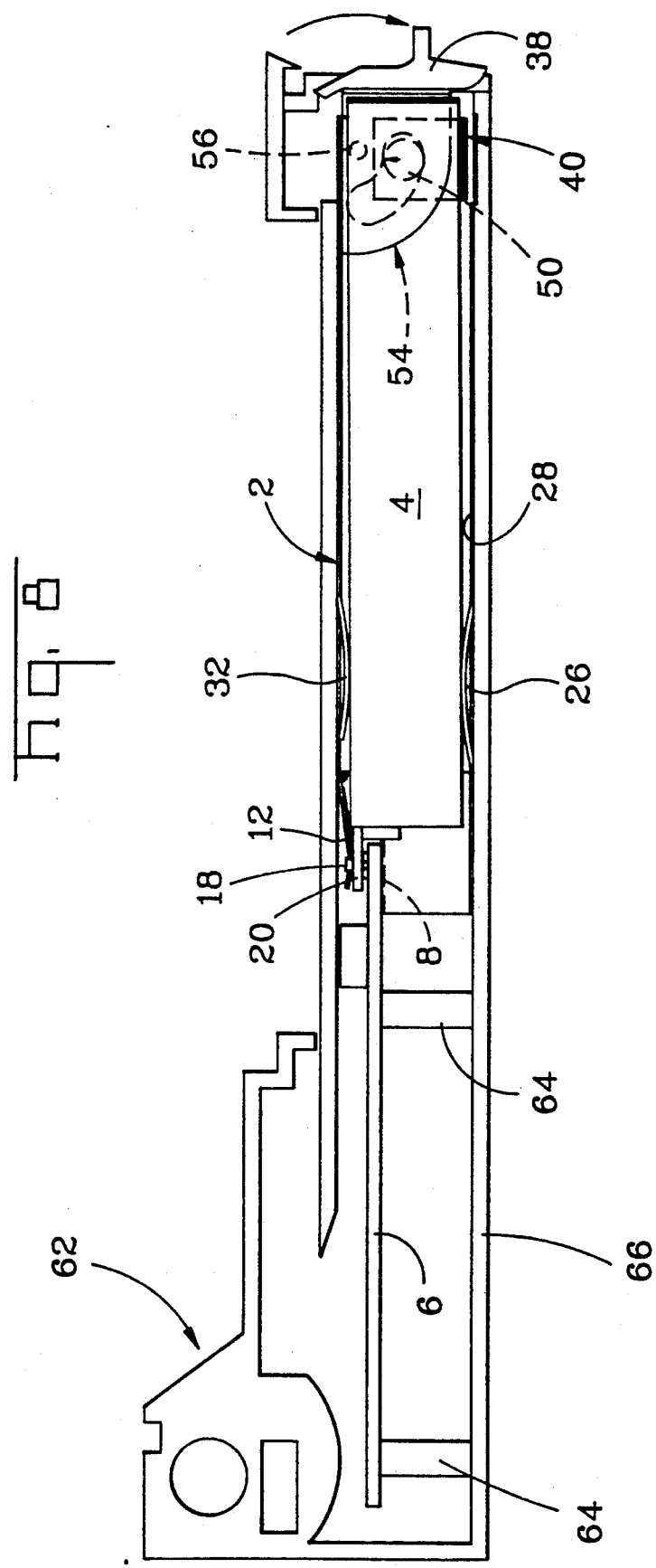

As the door 38 and camming member 54 are rotated clockwise to the closed position, the pins 50 and thereby the lifter 40 are pulled in an upward direction and thereby raise the end 46 of the device 4 as seen in FIGS. 3 and 8. As the end 46 of device 4 raises, the opposite end is pivoted downwardly under the urging of the compliant guide 32 to cause it to engage the mother board 6 through the compressive contact members fixed on the mother board. Over-stressing of the compressive contact members is avoided because of the compliancy of the guide 32.

Referring to FIGS. 4–8, a standard computer housing 62 is shown in cross-section, said section being substantially through the center of the housing 2 and mother board 6. Mother board 6 is fixed in the housing 62 via stand-off mounts 64 extending upwardly from the floor 66 of housing 62. Guide housing 2 is fixed to the mother board as described above in reference to mounting ears 8 and to the floor 66 by suitable fasteners.

Figure 5:
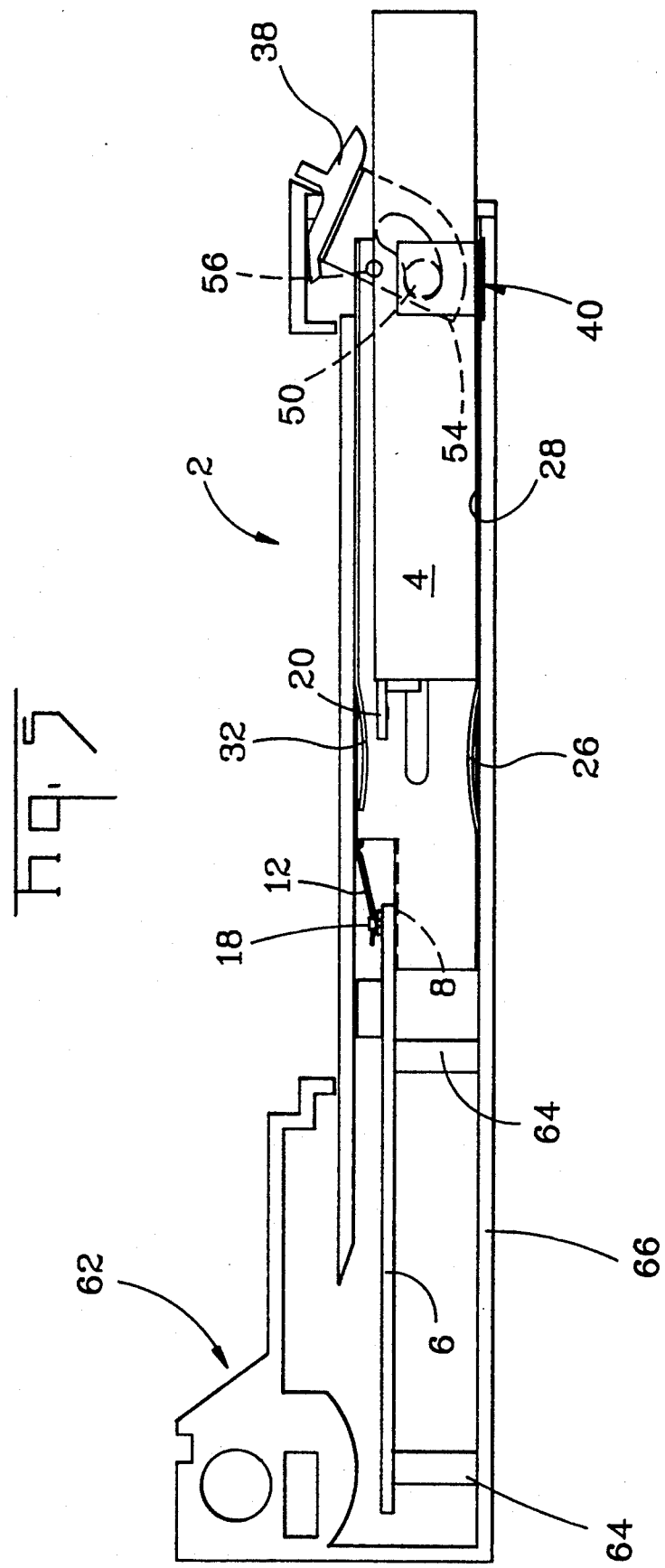
FIGS. 5-8 are views similar to FIG. 4 which show the insertion sequence of a hard disk drive (46)
Figure 6:
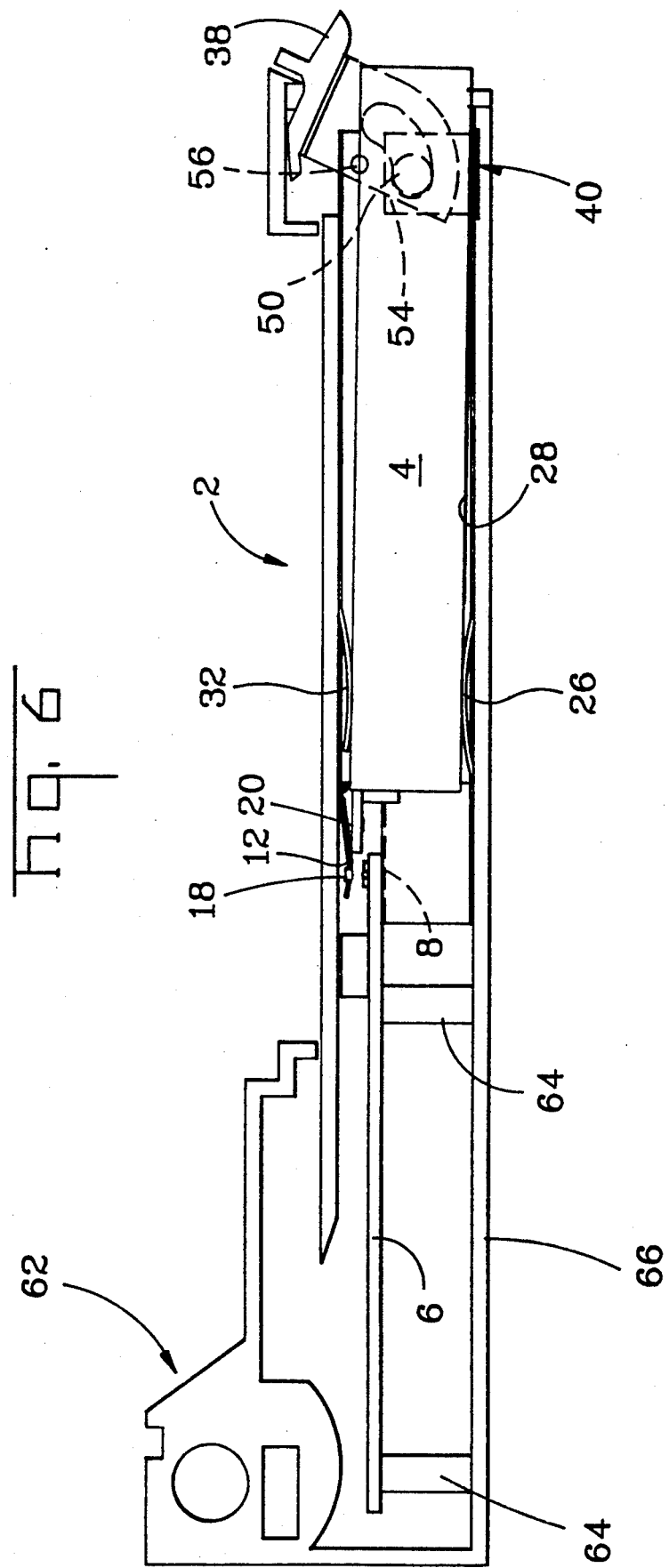

The insertion process can be seen in FIGS. 4–8. FIG. 4 shows the device 4 entering guide housing 2 through the opened door 38. Cam track 52 is holding the pins 50 and thereby the lifter 40 in a downward position. This position is maintained through FIG. 7. FIG. 5 shows the device 4 sliding along the floor 28 of housing 2 and just prior to its contact with the fixed guide 26. If the device 4 was permitted to continue in this trajectory, it would collide with the leading edge of the mother board 6 and would most likely rip apart the compressive contact members on the board. As seen in FIG. 6, the rigid guide 26 urges the device upwardly against the compliant guide 32 to cause it to clear the mother board and its contacts upon further insertion. The protective cover 12 is also at this point caused to rotate clockwise to expose the mother board's contact elements.

Figure 7:
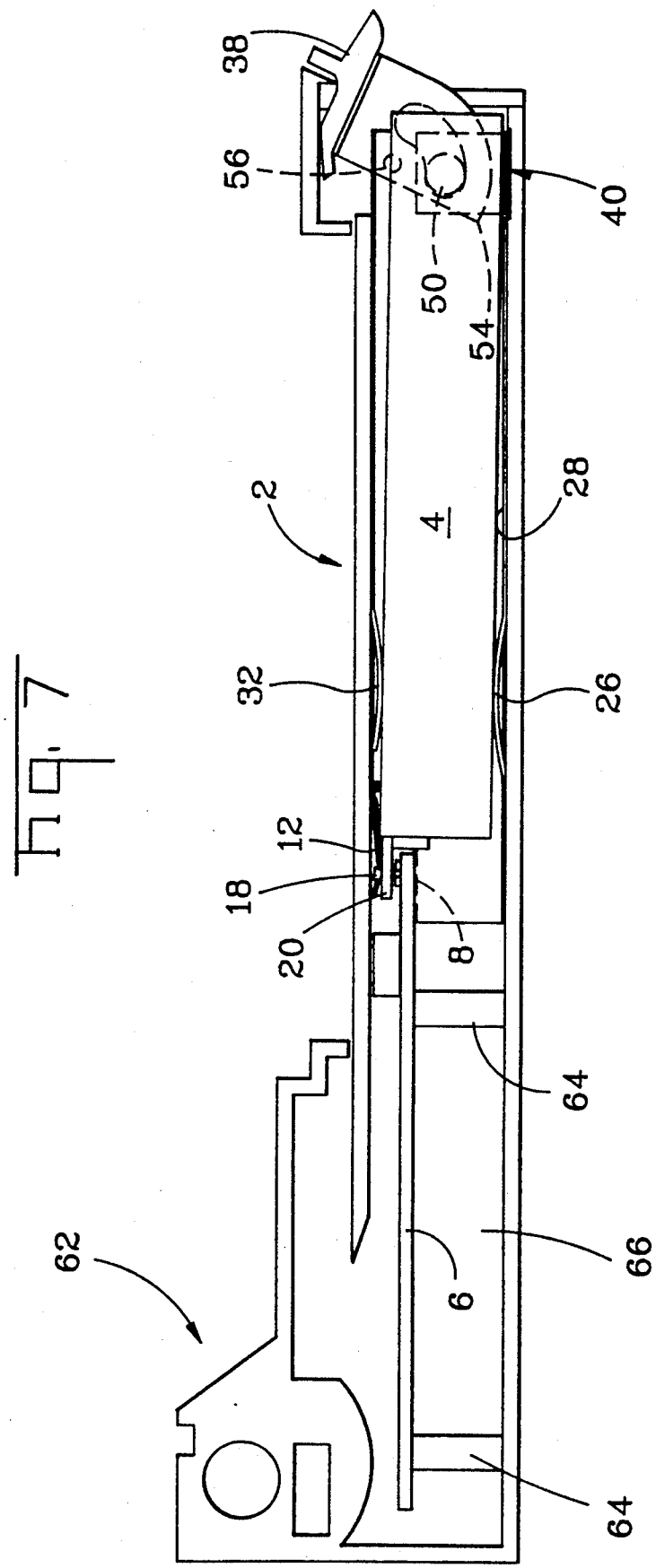

FIG. 7 shows the device 4 completely inserted but still held away from contact with the mother board. (See also FIG. 9.) Upon closure of the door 38, the rear end of the device is raised as described above and as seen in FIGS. 8 and 10 to thereby lower the opposite end of the device into electrical engagement with the mother board 6.

Figure 9:
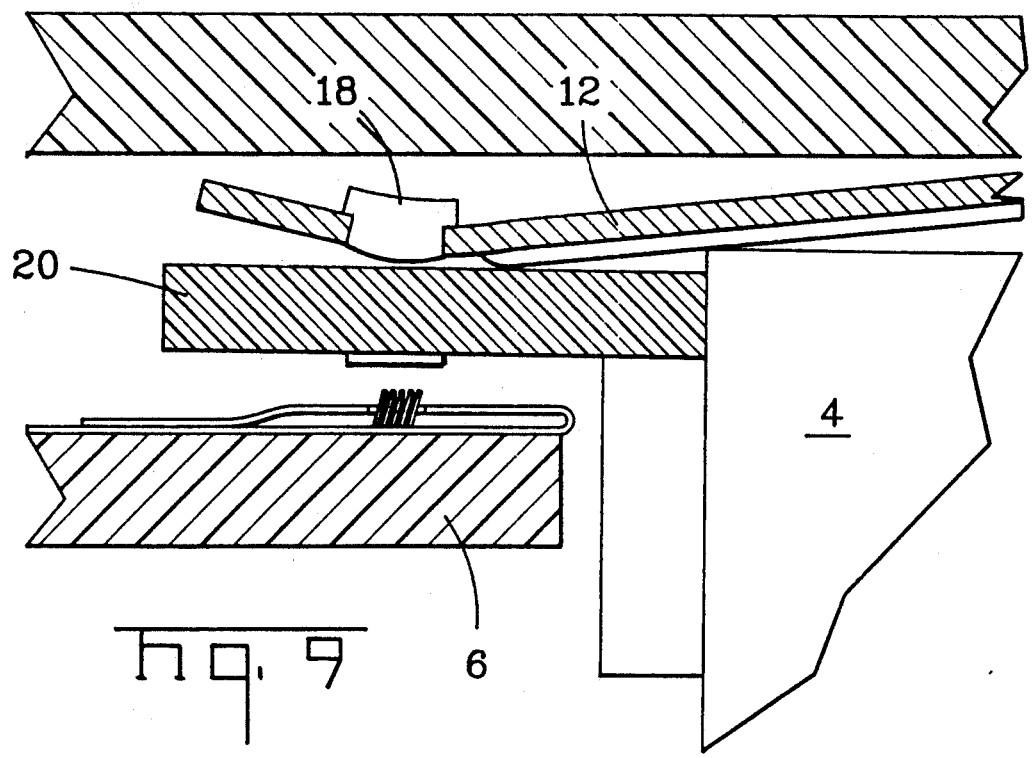
FIG. 9 is a fragmentary view showing the position of the hard disk drive and its associated printed circuit board relative to the contact surfaces of the mother board when the disk drive has been fully inserted but is not yet engaged with the circuit board (contacts are open)
Figure 10:
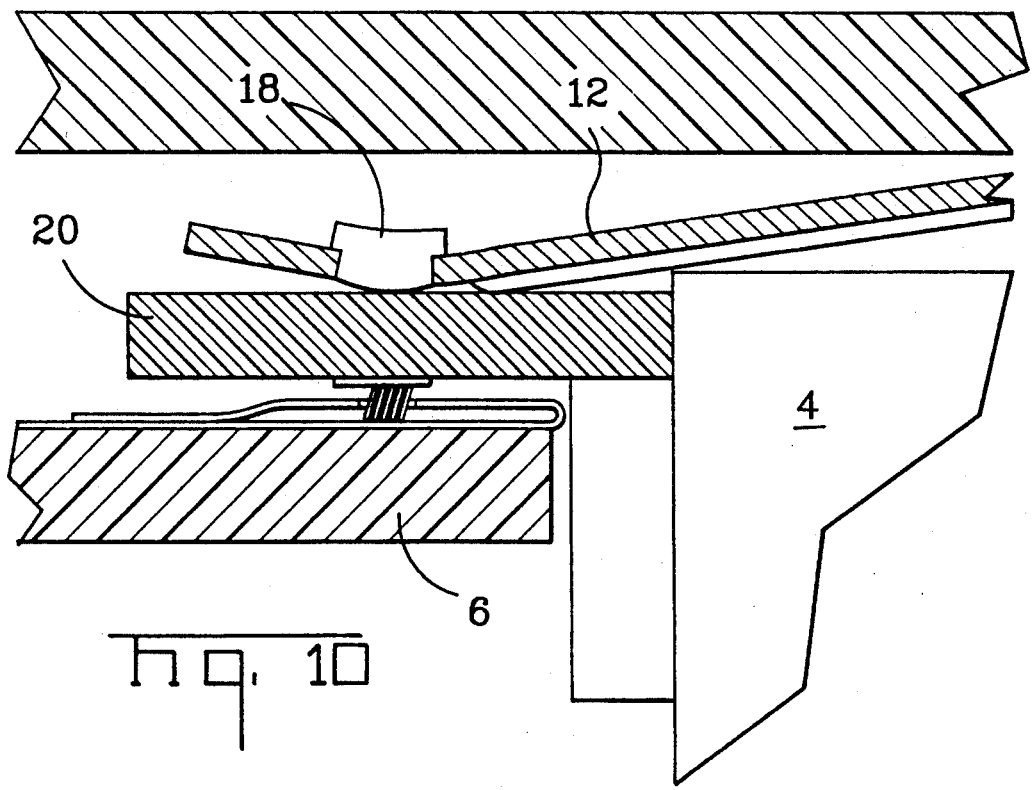
FIG. 10 is a view similar to FIG. 9 but shows the hard drive device and its associated circuit board after it is engaged (contacts closed). The compressible members (in this case, canted coil springs) are illustrated as being mounted on the mother board.
Figure 11:
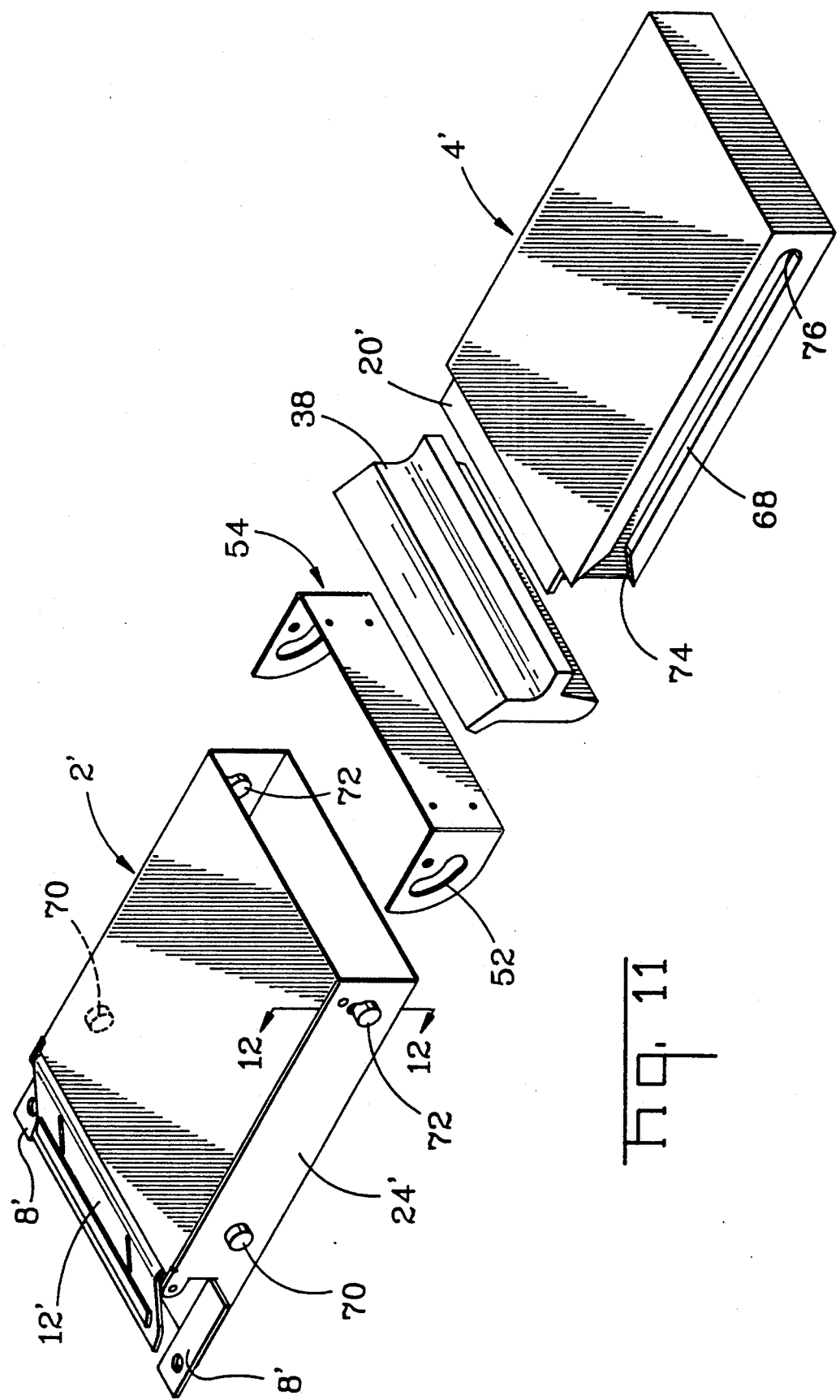
FIG. 11 is an isometric exploded view of another alternative embodiment of the invention which incorporates different means for guiding and camming the hard disk device into place.

When it is desired to remove the device 4, opening the door 38 will lower the lifter 40 and thereby the rear end of the device 4 to place the device back to the position of FIGS. 7 and 9 with electrical contact broken. The device can then be retracted from the computer to be stored or to be replaced by another device containing different software. A plurality of devices can thereby be used interchangeably within a computer equipped with the guide means of this disclosure.

Figure 12:
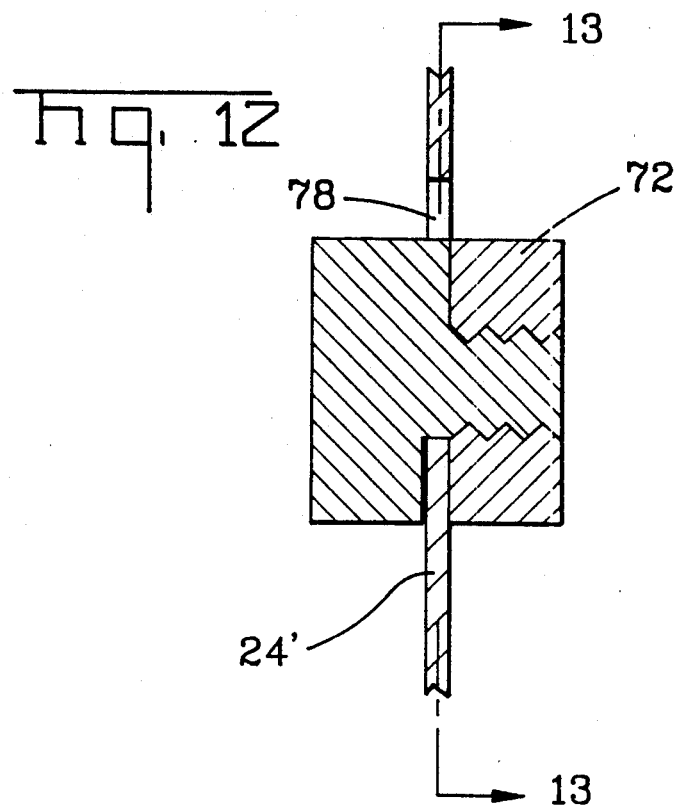
FIG. 12 is a cross-sectional view taken along the lines 12—12 of FIG. 11.
Figure 13:
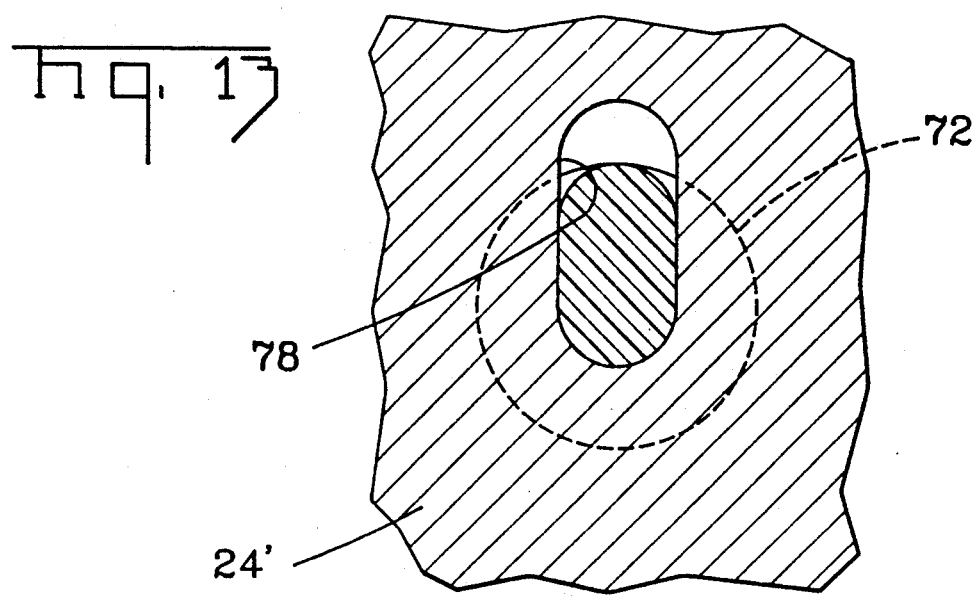
FIG. 13 is a cross-sectional view taken along the lines 13—13 of FIG. 12.

Referring now to FIGS. 11–16, an alternative embodiment is disclosed. The guide housing 2' is similar in construction to the previously described housing 2 except for the vertical guide means. In this embodiment, the hard disk drive device 4' is made with a guiding channel 68 on each side for cooperation with a pair of fixed guide pins 70 on the mother board end of the housing 2' and a pair of movable guide pins 72 on the opposite end. The guide pins 70 and 72 extend inside the housing 2' to engage in the channels 68 on the device 4' to control the movement thereof. Each channel 68 has a bell-mouthed entry portion 74 to ensure proper contact with the guide pins and an abrupt end 76 on the rear end to serve as a positive stop upon insertion. Housing 2' has mounting features and a protective cover similar to the previously described housing 2. The movable pins 72 are mounted in slots 78 in the sidewalls 24' of housing 2'. The construction of the pins 72 is shown in FIGS. 12 and 13. As can be seen in these figures, the pin has a limited amount of guided vertical movement in the slot 78. The camming member 54 and door 38 are the same as in the previous embodiment.

Figure 14:
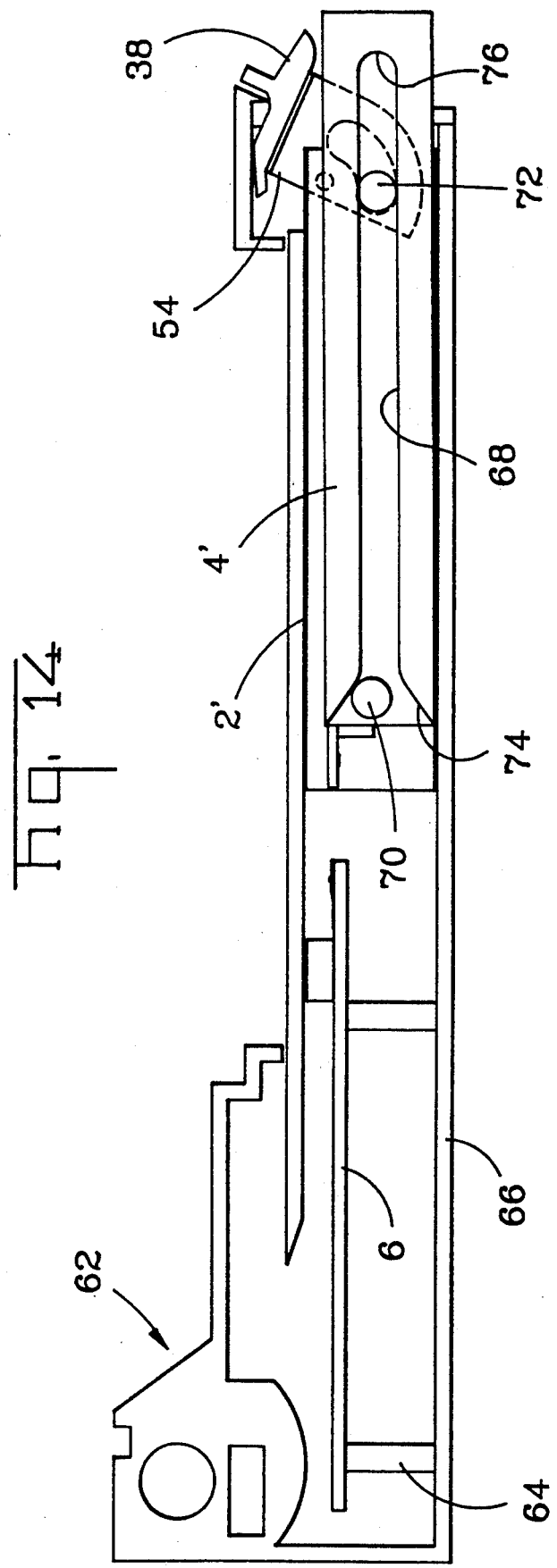
FIG. 14 is a cross-sectional view of a small computer which is illustrative of the disk drive shown in FIG. 11 as it is inserted and engages guide pins 70, which in turn raises the nose of the disk drive to ensure zero insertion force.

As illustrated in FIG. 14, the movable pin 72 is held in a downward position by camming member 54 to hold the rear end of the device 4' in a lowered position. The device slides along the floor of the guide housing 2' as it is inserted until the bell-mouthed portion 74 of the channel 68 picks up the fixed guide pin 70 at which time the nose of the device is urged upwardly by the pin. This upward movement causes the printed circuit board 20' of the device 4' to clear the end of the mother board as previously described.

Figure 15:
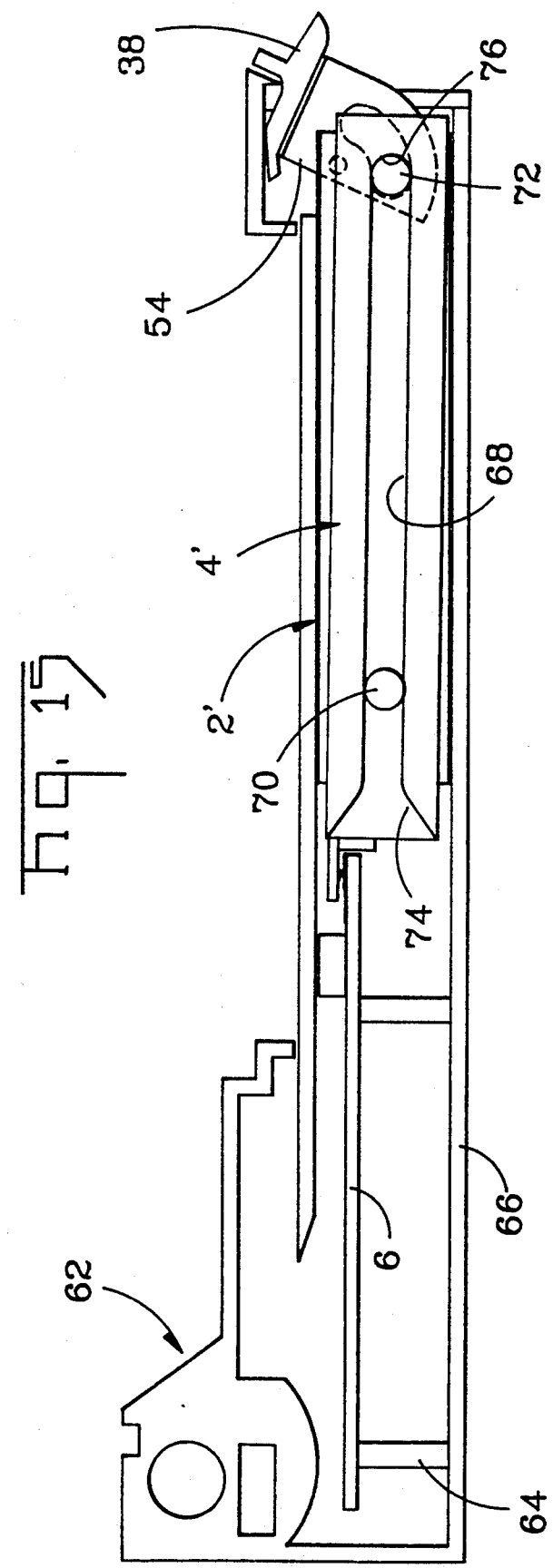
FIG. 15 is a view similar to FIG. 14 but shows the drive device fully inserted but not yet contacting the mother board.
Figure 16:
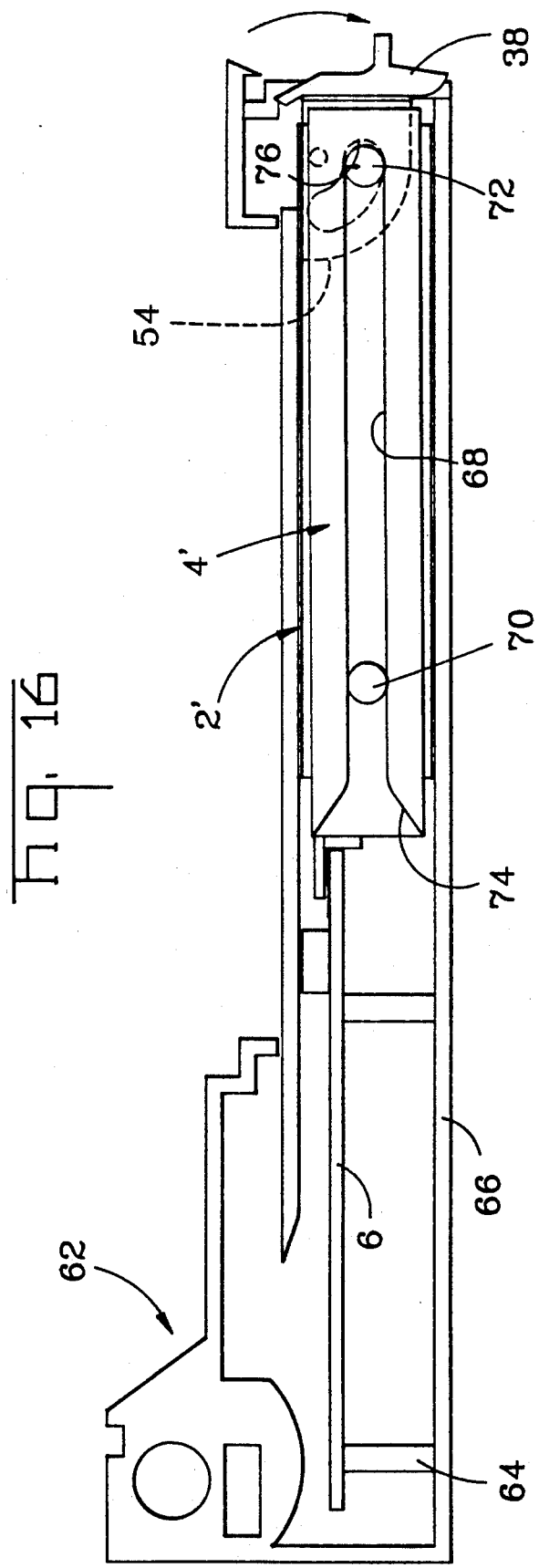
FIG. 16 is a view similar to FIG. 15 but shows the drive device lowered into contact with the mother board (the door is closed)

FIG. 15 shows the device 4' fully inserted but not electrically connected to the mother board 6 due to the lowered position of the movable guide pin 72. As the door 38 is closed (see FIG. 16), the camming member 54 raises the movable pin 72 in its slot 78 and thereby raises the rear end of the device 4' which pivots counterclockwise about the fixed pin 70 to make electrical contact with the mother board.

As in the previous embodiment, removal of the device is accomplished by opening door 38 which breaks the electrical contact with the mother board and permits the drive to be withdrawn with no possibility of damaging the mother board or its compressive contact members.

The above-described embodiments of the invention facilitate the connecting of a mother board directly to a modular device by a mechanical docking assembly. For purposes of illustration, the compressive contact members are shown to be mounted on the circuit board. However, it may be desirable to locate the compressive members on the modular component instead in order to mate with simple printed circuit contact pads on the mother board, and such a modification is considered to be a part of this invention. It may also be desirable to connect a modular component to the traces and/or contact pads of a printed circuit in an indirect manner, i.e., by an interfacing connector.

Figure 17:
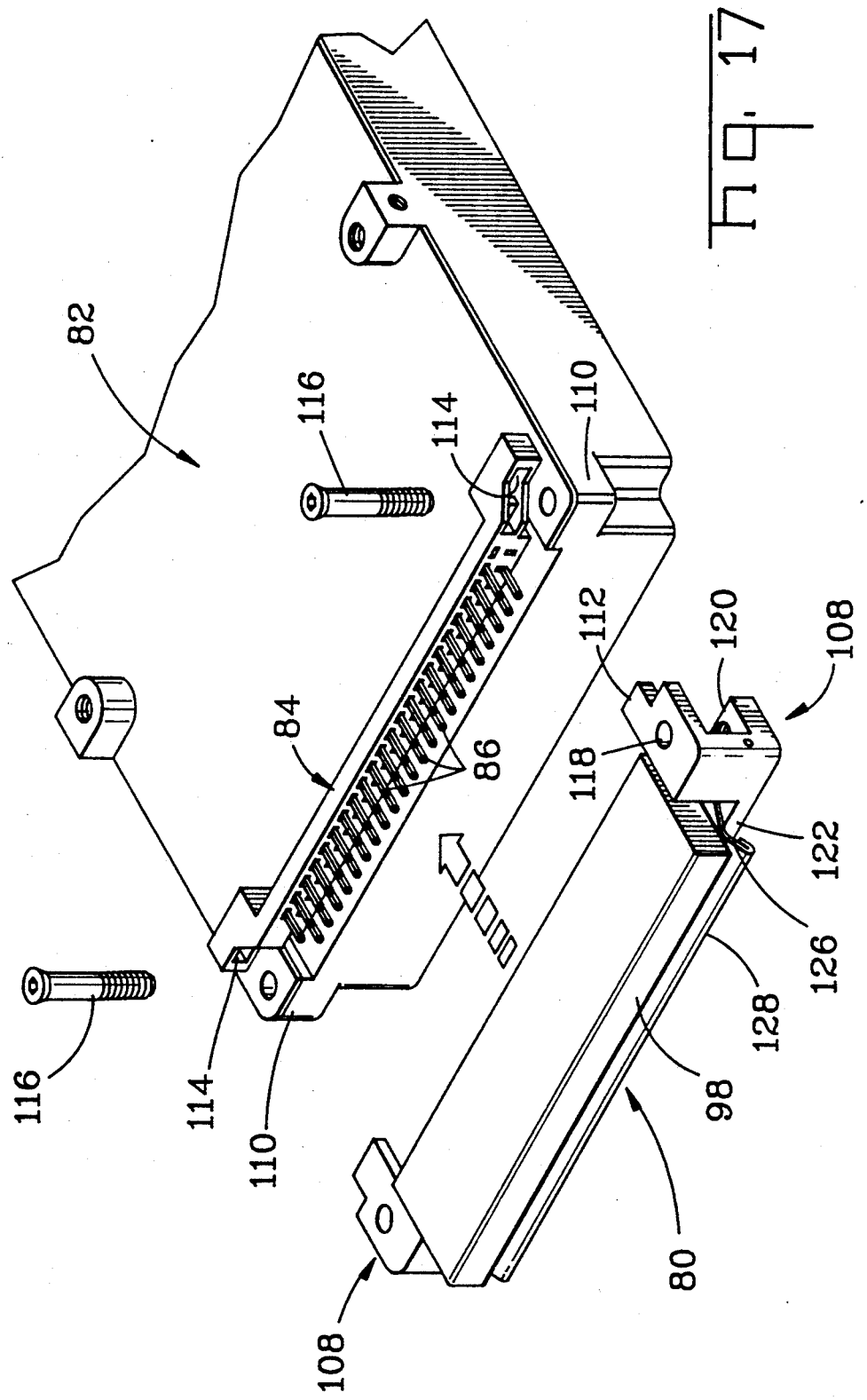
FIG. 17 is an isometric view of an interfacing connector according to another embodiment of the present invention, the connector being shown in exploded relationship with a standard hard disk drive.
Figure 19:
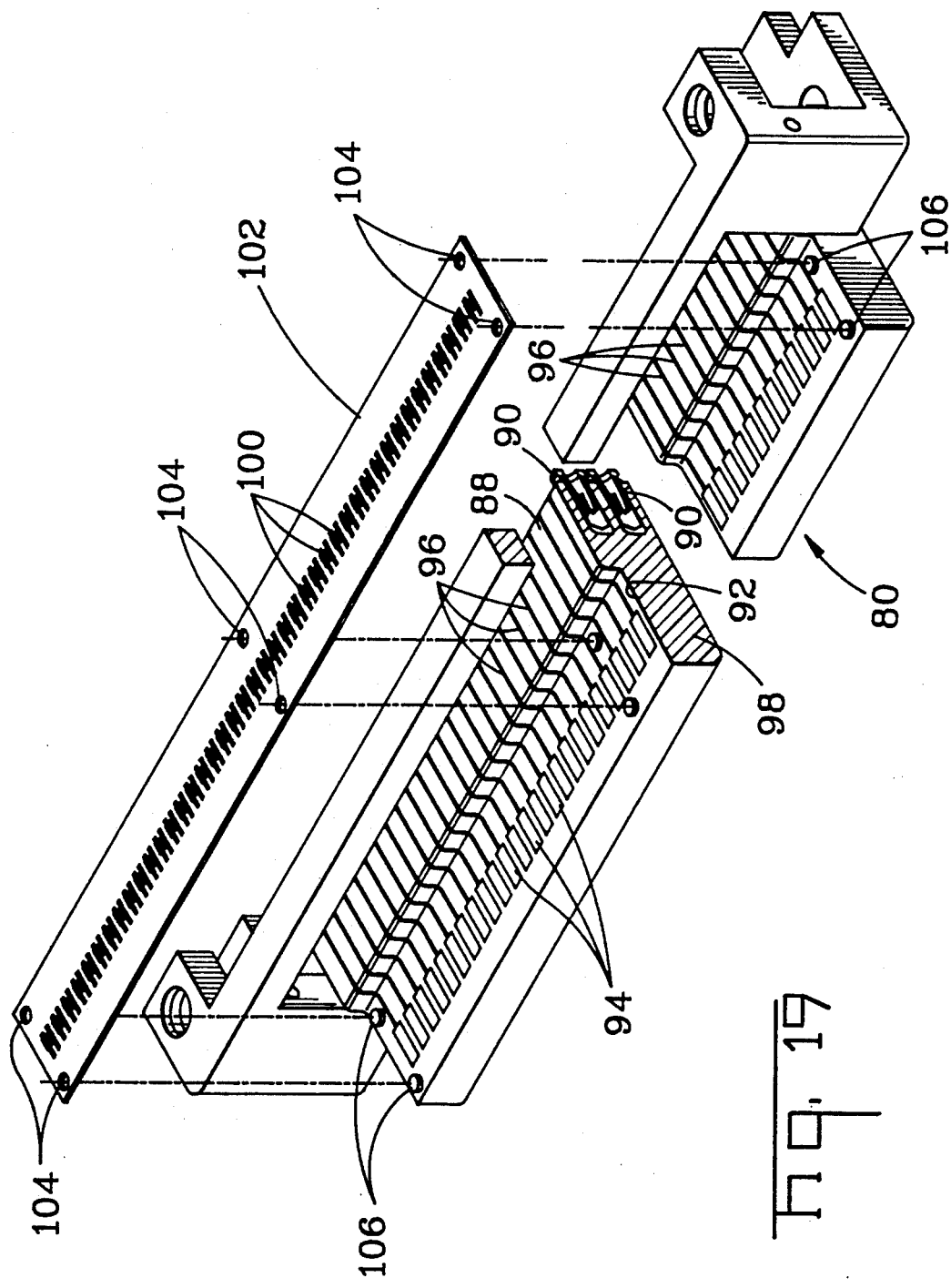
FIG. 19 is an exploded and partially sectioned isometric view of the underside of the connector of FIG. 17 and shows the compressive members (canted coil springs) exploded therefrom.
Figure 20:
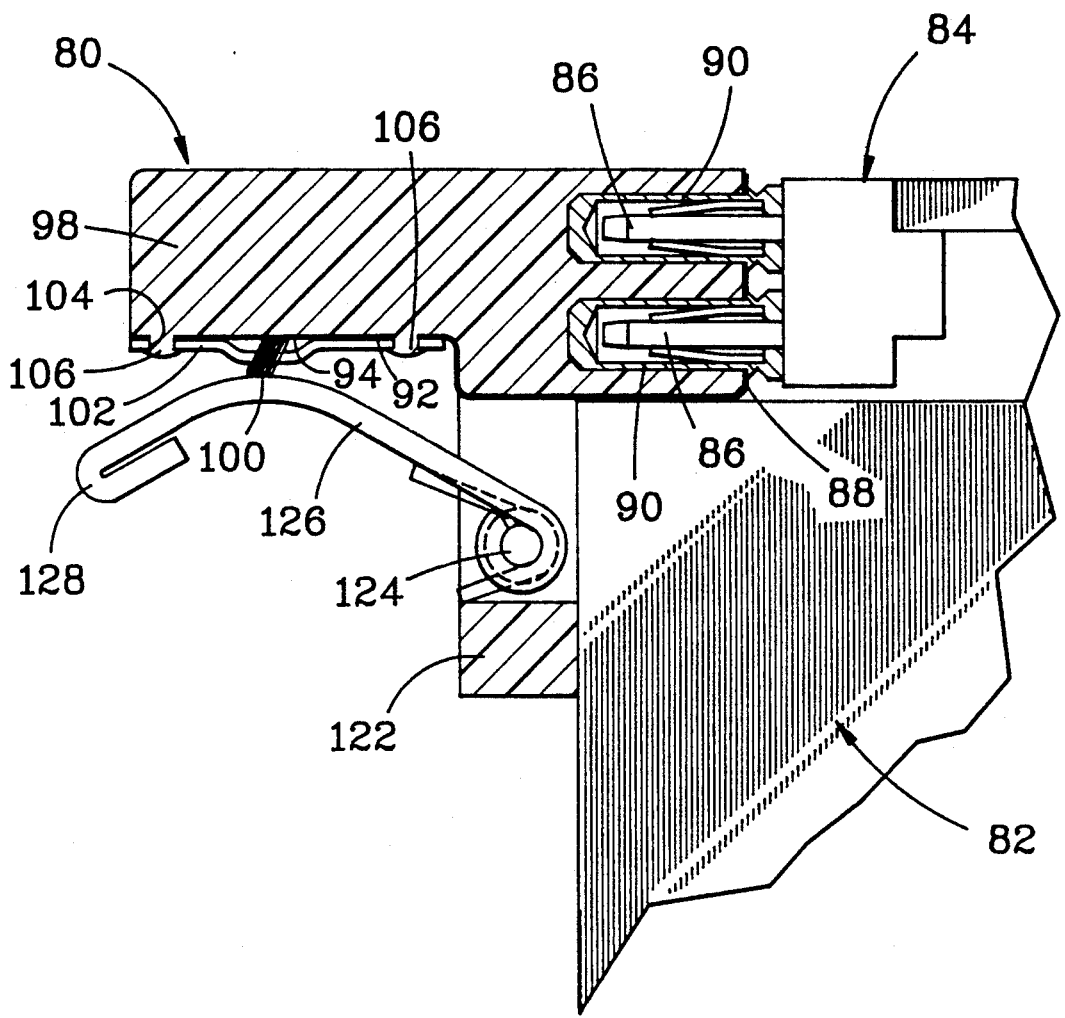
FIG. 20 is a cross-sectional view taken along the lines 20—20 of FIG. 19.

Accordingly, FIG. 17 shows an interfacing connector 80 in alignment with a standard disk drive 82. These drives are supplied with a pin connector 84 having two rows of pins 86 and which is permanently affixed to the disk drive. Connector 80 contains two rows of sockets 90 (FIGS. 19 and 20) for receiving pins 86 to interconnect them to a flexible etched circuit 88 which is fixed to the under surface 92 of the connector 80 and which contains a single row of contact pads 94 connected via traces 96 to two rows of pads on the socket side of the connector (FIG. 19). The sockets 90 are soldered to these pads to cause electrical continuity from the hard drive pins 86 to the row of contact pads 94 on the underside of the connector projection 98. The compressive contact members in this embodiment are canted coiled springs 100 (one for each pad 94) which are retained in a strip 102 of plastic material.

Strip 102 has a plurality of holes 104 in alignment with protruding pins 106 on housing projection 98 and is heat staked to the connector to retain the canted coil springs 100 in proper alignment with their respective contact pads 94. The strip 102 also serves to secure the flexible etched circuit 88 to the connector.

Figure 18:
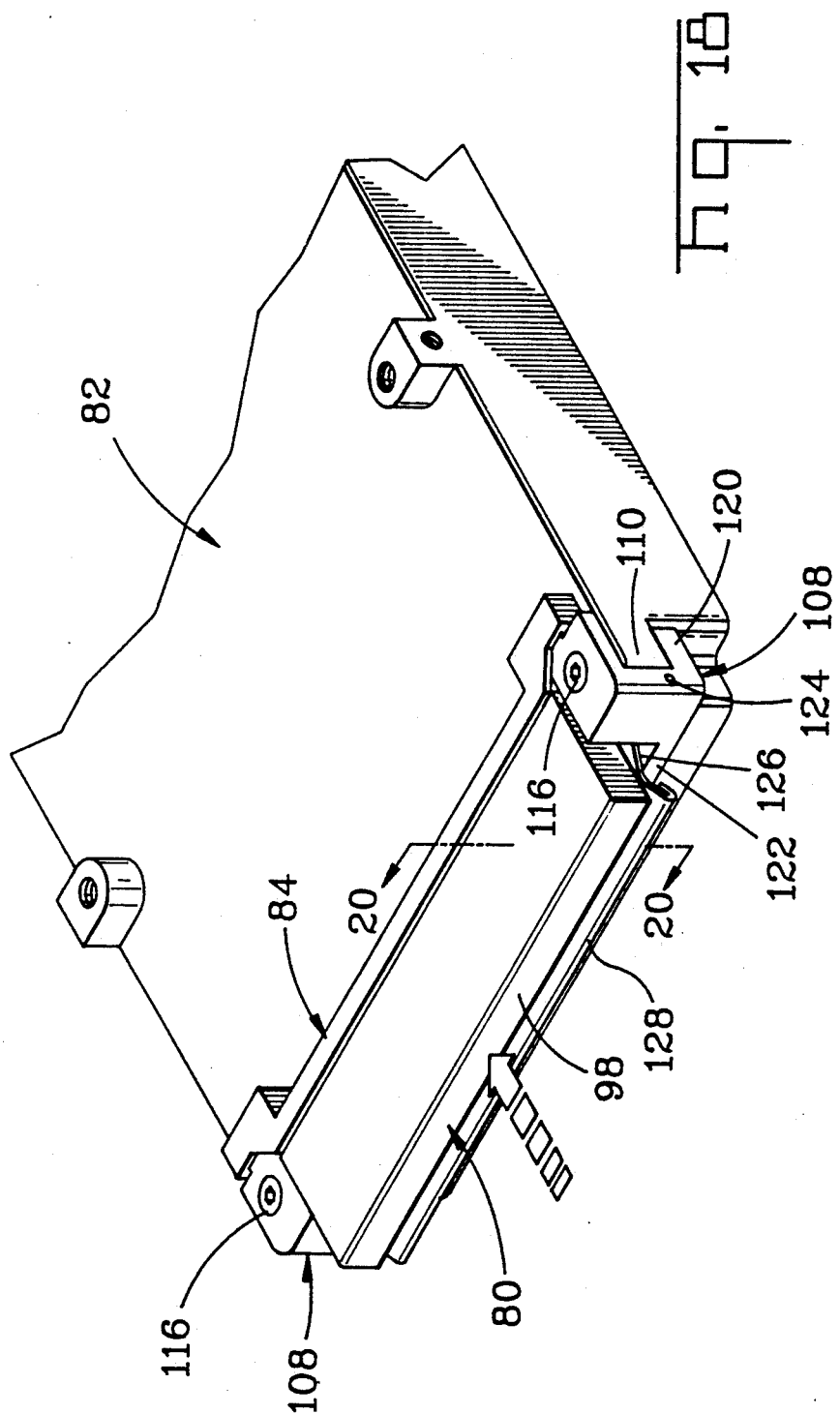
FIG. 18 is a view similar to FIG. 17 but showing the interfacing connector mounted to the hard disk drive.

The connector 80 must be rigidly fixed to the disk drive to withstand contact forces and to avoid damaging the pins 86. To accomplish this, the connector has extended ends 108 configured to straddle an existing ledge 110 on each side of the disk drive 82 and a protruding ear 112 which is received by a cavity 114 in the ends of the existing pin connector 84 (see FIG. 18). A fastener 116 is inserted through the hole 118 in the end 108 and extends through the disk drive ledge 110 and is secured in the lower portion 120 of end 108. This rigidly connects the connector 80 to the disk drive 82 to make them, effectively, one piece. A lower extension 122 is provided on connector 80 to add mounting support and to provide a pivot means 124 about which a protective cover 126 rotates. Cover 126 is spring loaded into light engagement with the row of canted coil springs 100 to protect the springs and the FEC when the connector is disengaged from a computer. The protruding end 128 of cover 126 is contoured to be easily pushed open by the mother board when the connector and the disk drive are inserted into the computer.

The disk drive and connector 80 are guided into the computer in the same manner as the previously described embodiments. The major difference in these embodiments is the location of the compressible contact members.

Figure 21:
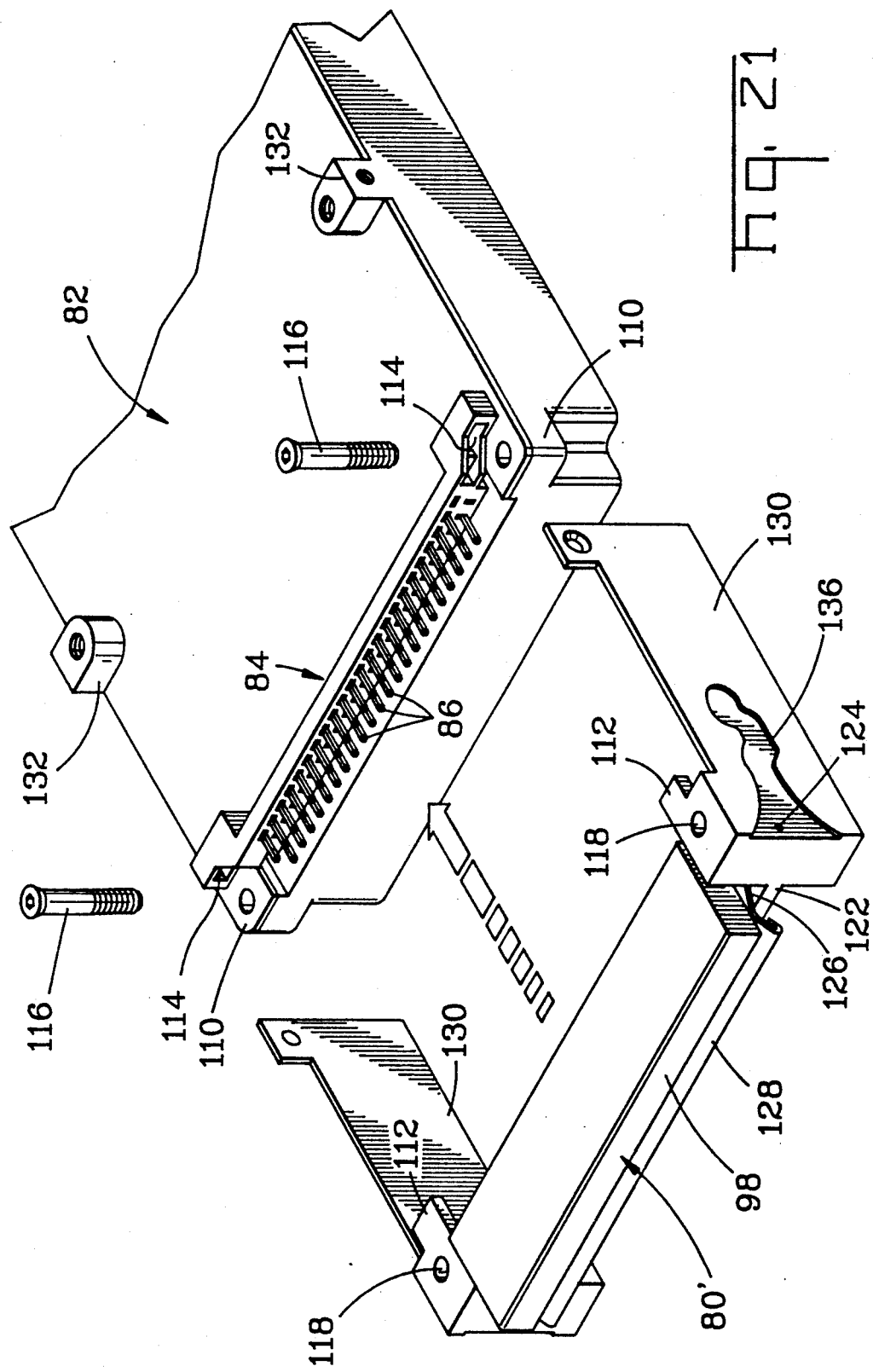
FIG. 21 is an isometric view of an alternative embodiment of the interfacing connector which includes a pair of cam tracks for engagement with a guide pin in the sheet metal guide housing.
Figure 22:
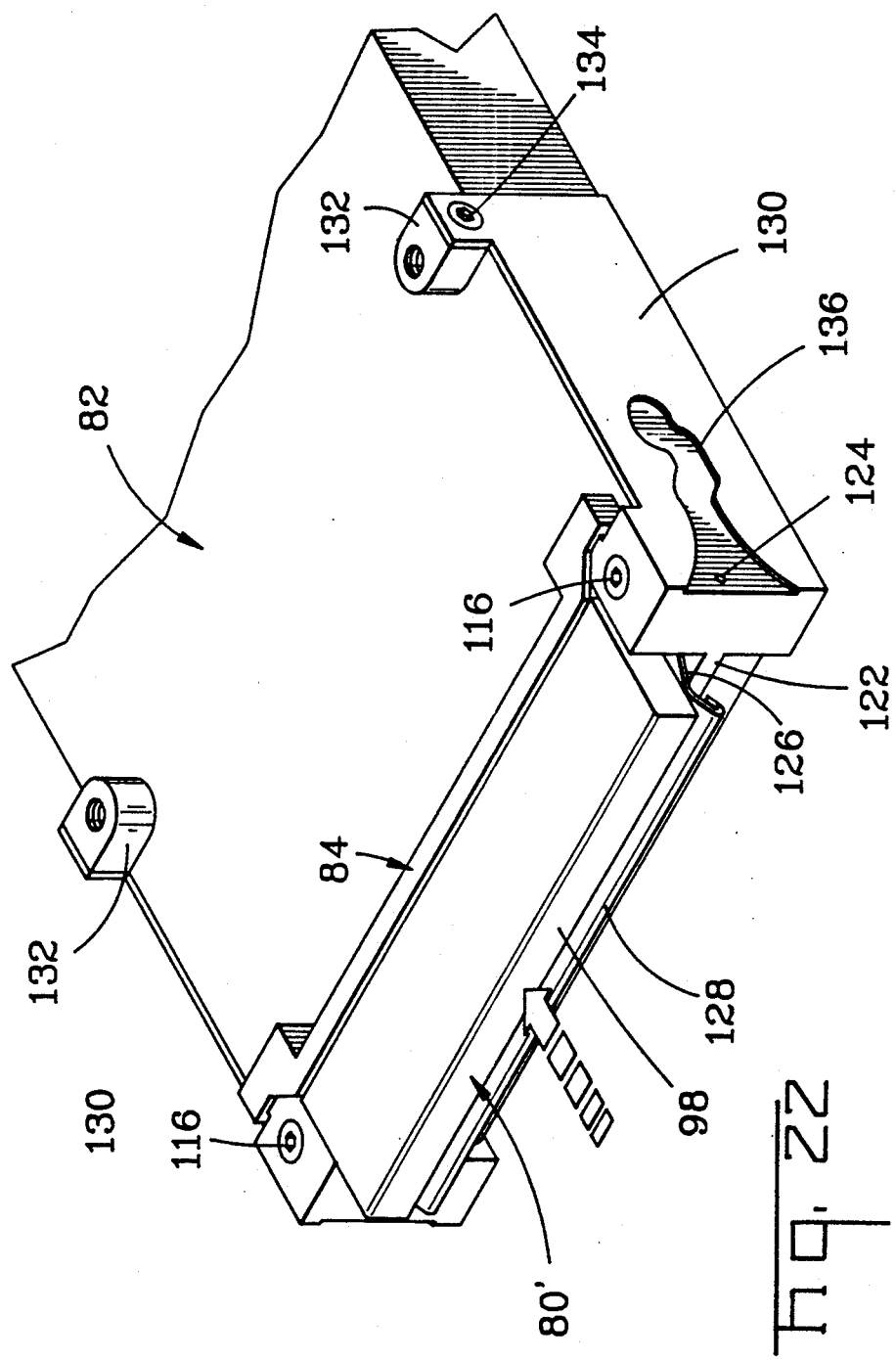
FIG. 22 is a view similar to FIG. 22 and shows the connector fixed to the drive device.

FIGS. 21 and 22 illustrate a further embodiment of the interfacing connector. Connector 80' has additional side extensions 130 which add to the rigidity of the assembly by extending back to existing mounting features 132 on the disk drive 82 and being attached to them by screws 134.

Further, these extensions 130 may contain a cam track 136 to be engaged by a fixed guide pin in a guide housing similar to housing 2'. This would eliminate the need for a lifting feature on the guide housing since vertical movement would be controlled by the cam traces 136 as it passes over the fixed guide pin (not shown).

Figure 23:
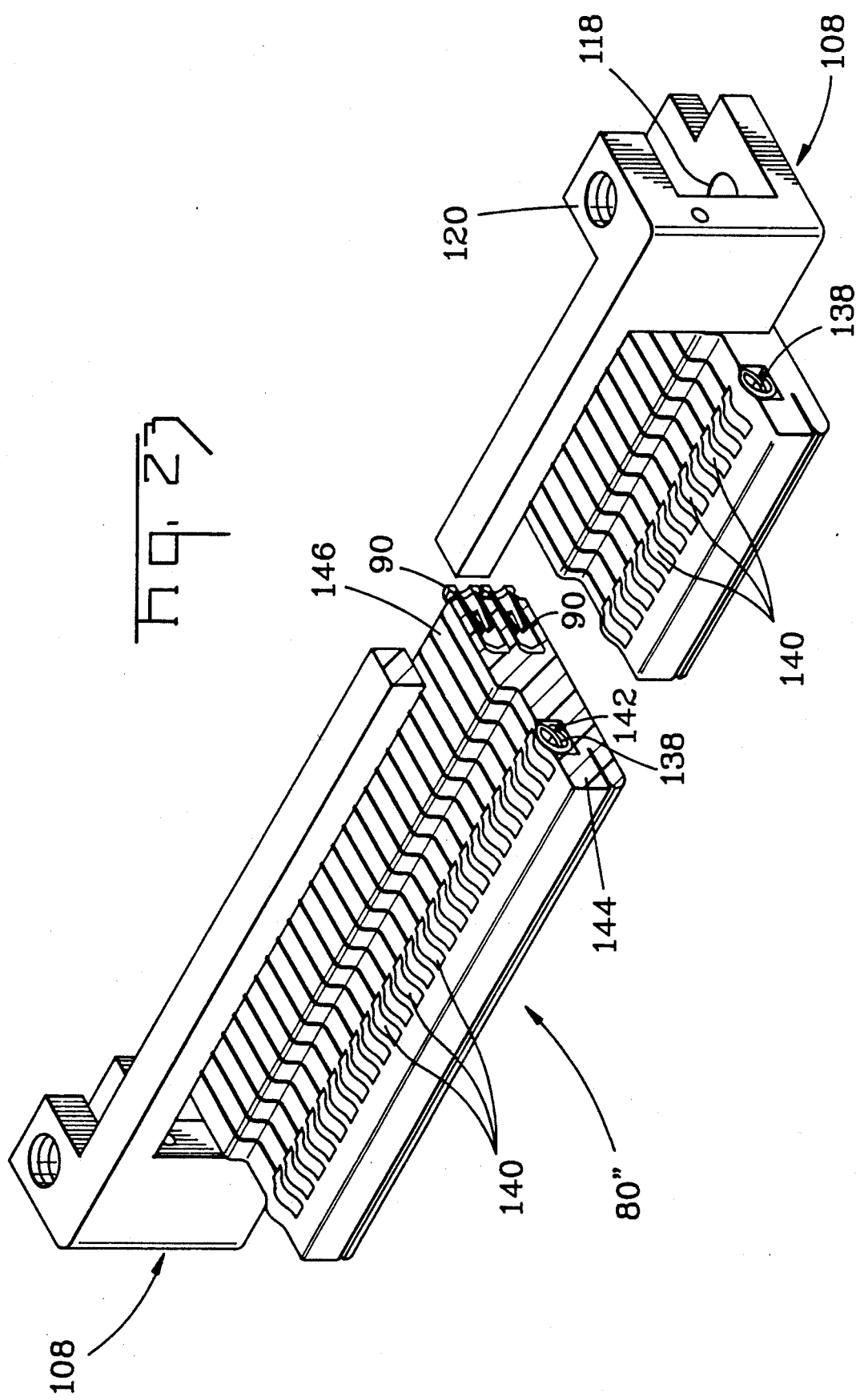
FIG. 23 is a partially-sectioned isometric view of the underside of yet another alternative embodiment of the interfacing connector wherein a single canted coiled spring is inserted in a transverse channel under a flexible etched circuit to provide the necessary compressive forces for contact to a mother board.
Figure 24:
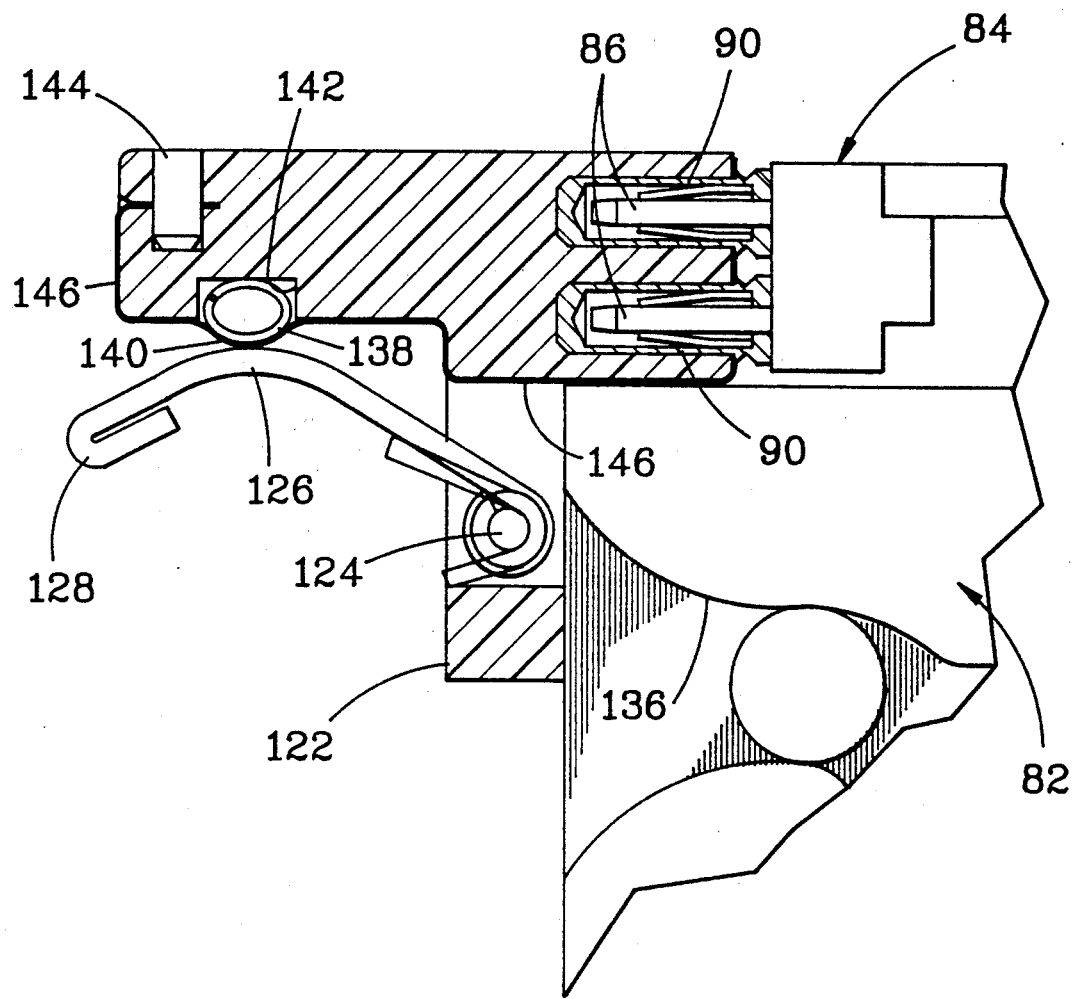
FIG. 24 is a cross-sectional view taken through the embodiment of FIG. 23.

A further embodiment of an interfacing connector is illustrated in FIGS. 23 and 24. This connector 80" is similar to connector 80 with the exception of the compressive contact area. In this connector, a single canted coiled spring 138 supplies the compressive force for the entire row of contact pads 140. The spring 138 lies in a channel 142 in the connector projection 144 beneath the flexible etched circuitry 146 to urge said circuitry against the mother board pads to effect electrical contact therewith.

Figure 25:
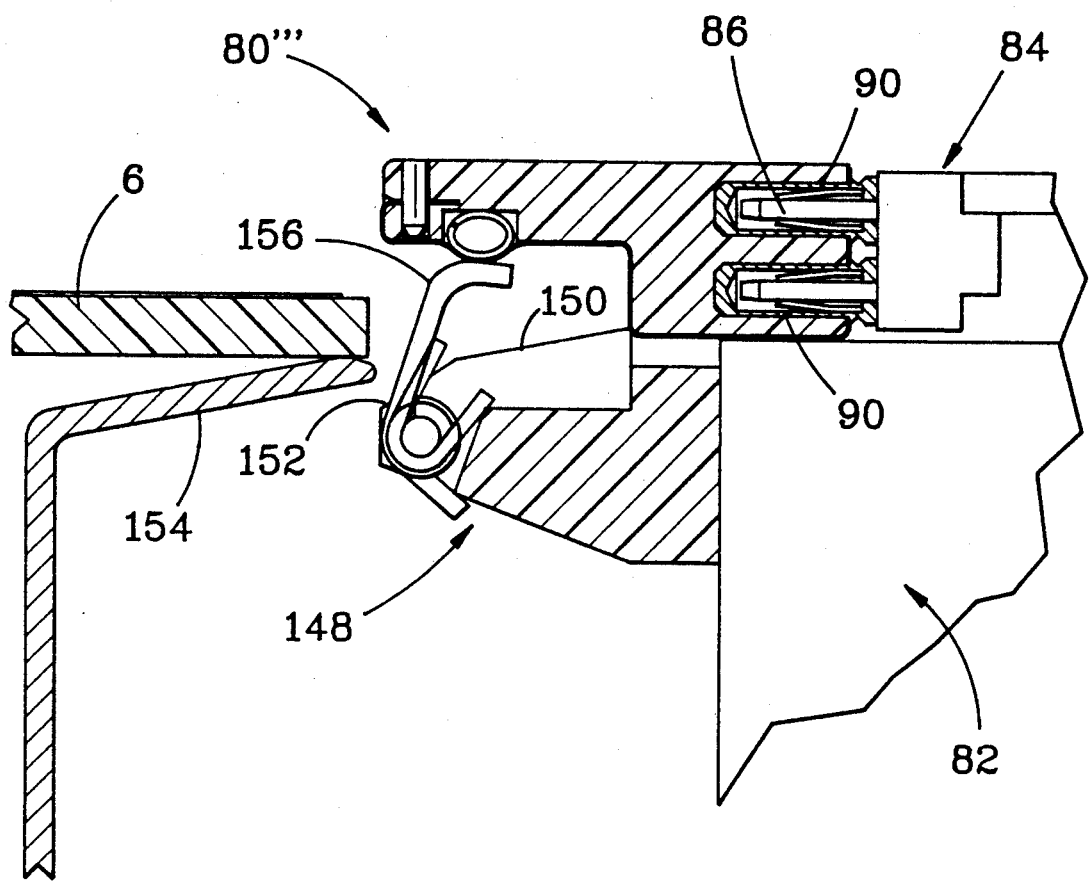
FIG. 25 is a cross-sectional view of a still further alternative embodiment of the interfacing connector.
Figure 26:
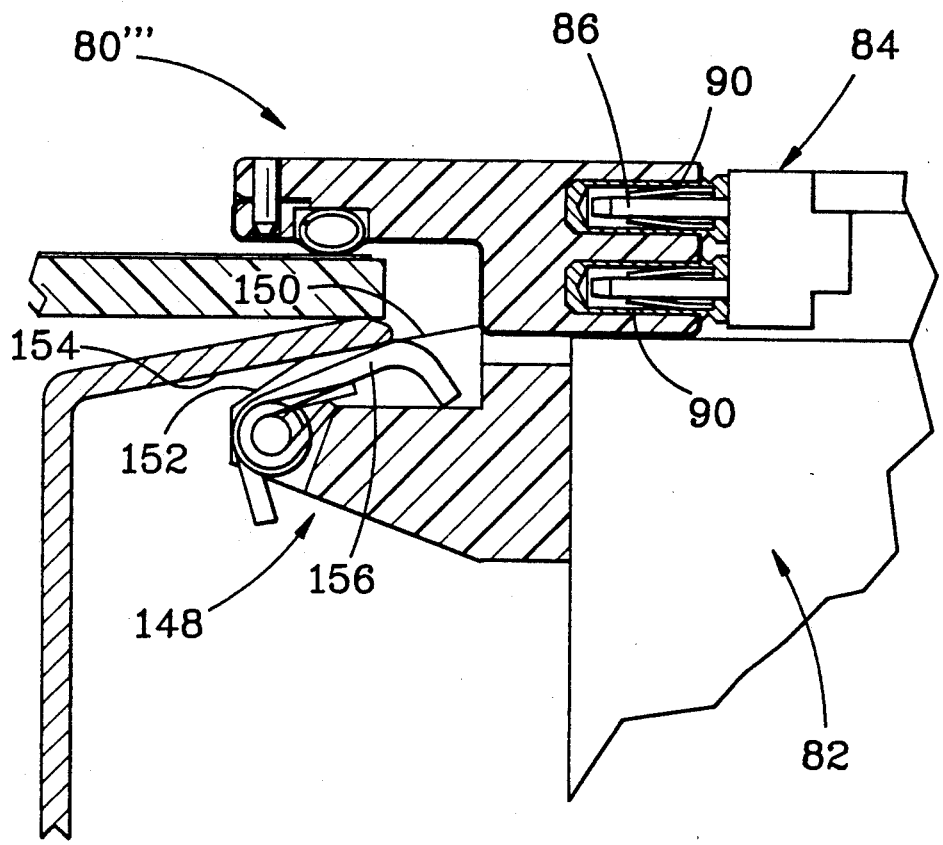
FIG. 26 is a view similar to FIG. 25 but showing the connector in engagement with a mother board.

A still further embodiment of an interfacing connector is shown in FIGS. 25 and 26. The contact portion of this connector 80''' is the same as that shown in connector 80" but the lower portion 148 is configured to provide a camming surface 150 having a beveled lead-in 152 on its forward end. This camming surface cooperates with an activating cam 154 which is formed in the guide housing (not shown but similar to 2 and 2'). Cam 154 is located directly under the mother board 6 and could be a simple wedge-shaped separate piece attached to the bottom of the mother board 6. As the drive device 82 is inserted, a light spring (not shown) formed up from the floor of the guide housing, urges the nose of the device upwardly to clear the mother board as previously described. As the drive and connector approach the final position, cam lead in 152 and subsequently 150 are picked up by the leading end of the angled cam face 154 to force the drive and connector downwardly to engage the circuit pads on mother board 6 (see FIG. 26). This connector also has a protective cover 156 which is forced open by the board 6 and cam 154 upon insertion of the device in a similar manner as the aforementioned embodiments. This connector eliminates the need for separate guide members to be built into the guide housing.

To this point, we have described means for making a zero insertion force entry of a hard disk drive device into a computer housing, but it is not intended to limit the scope of this invention to such use. FIGS. 27-34 illustrate how the invention may be used for any type device including a cabled connector wherein it is desired to dock the device to another device in a manner which allows the use of relatively fragile compressive contact members. To date, it has been difficult to make such a docking connection to another device because the straight line sliding insertion of a device would destroy the compressive contact member.

We have also thus far described the guide housing 2 as being made of formed sheet metal, but it is to be understood that this housing could also be made of any suitable material. It could also be a molded plastic unit or even be designed and molded directly as an integral part of a device housing.

Figure 27:
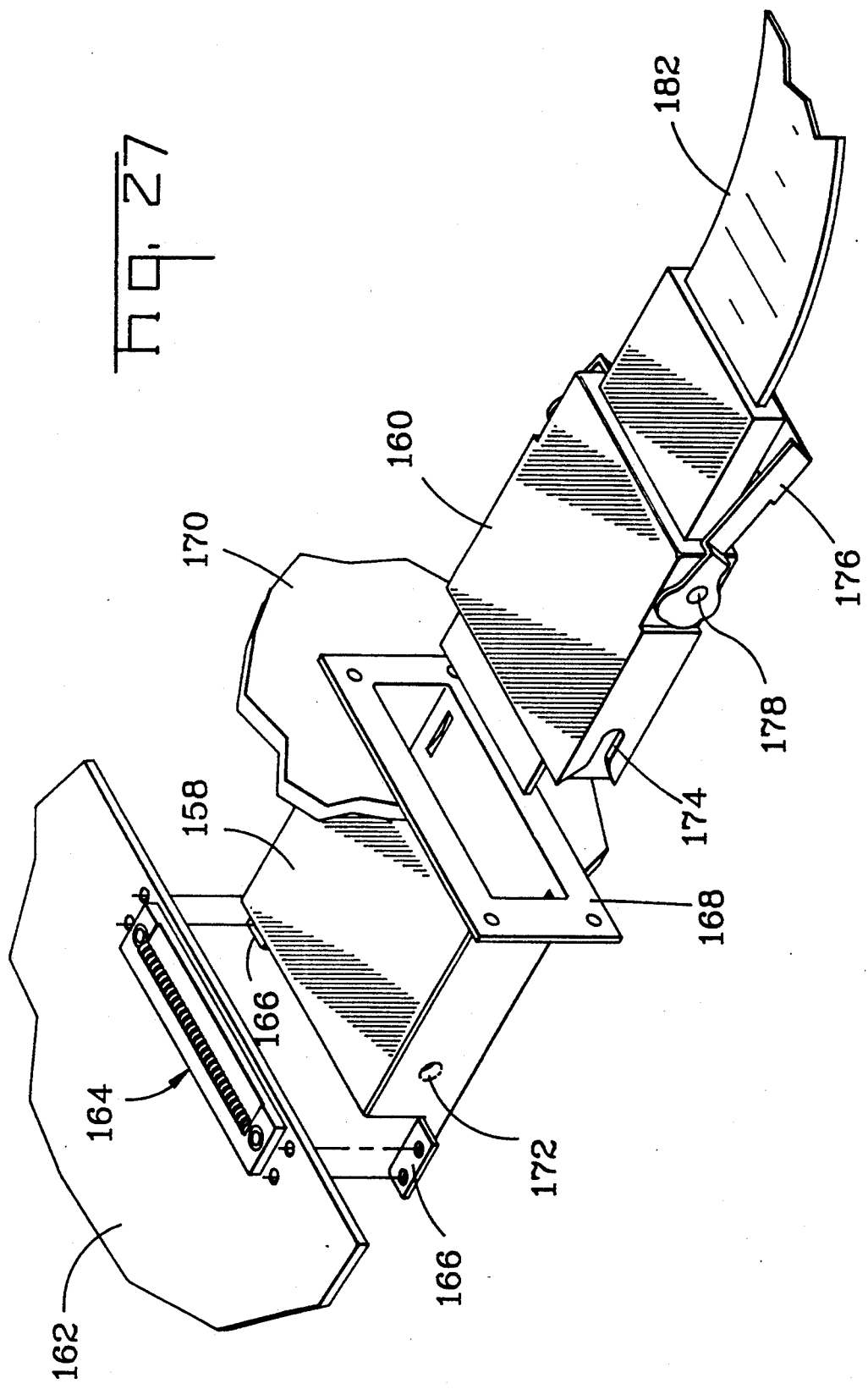
FIG. 27 is an isometric view of a docking connector which utilizes the same type of guidance and contact system as the disk drive embodiments.
Figure 28:
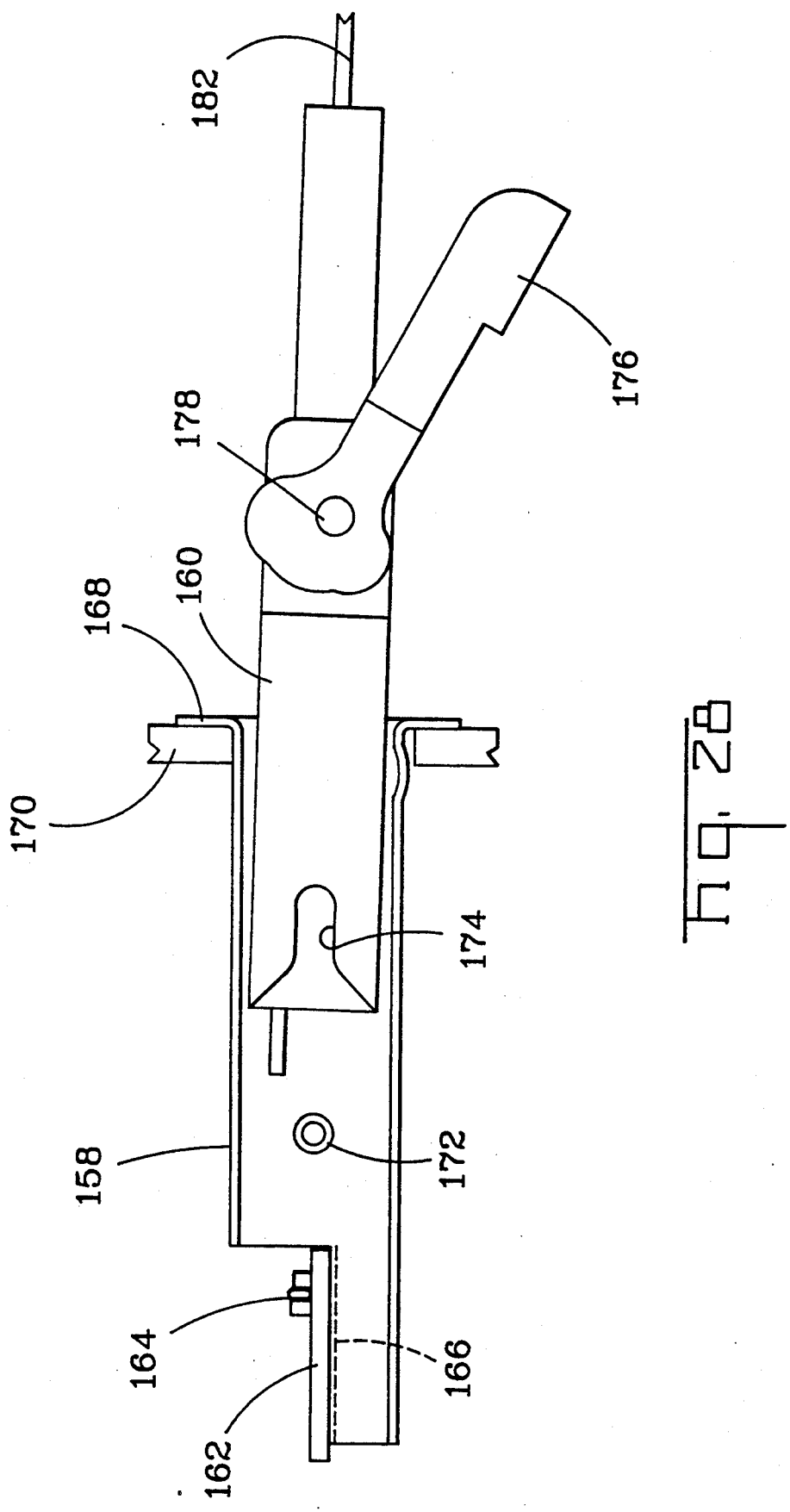
FIGS. 28-30 are sectional sequence views showing the insertion and contact motions of the cabled docking connector.
Figure 29:
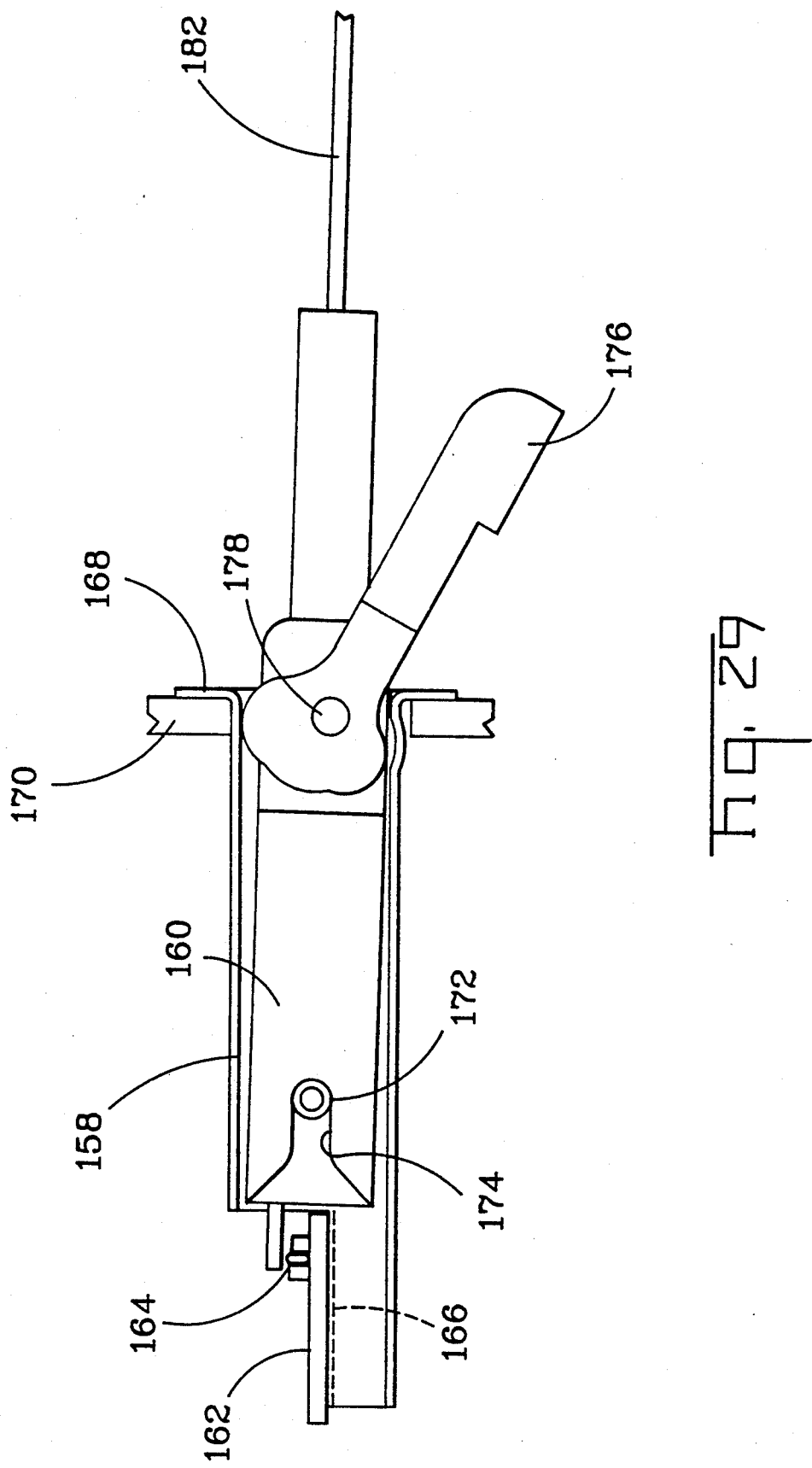
Figure 30:
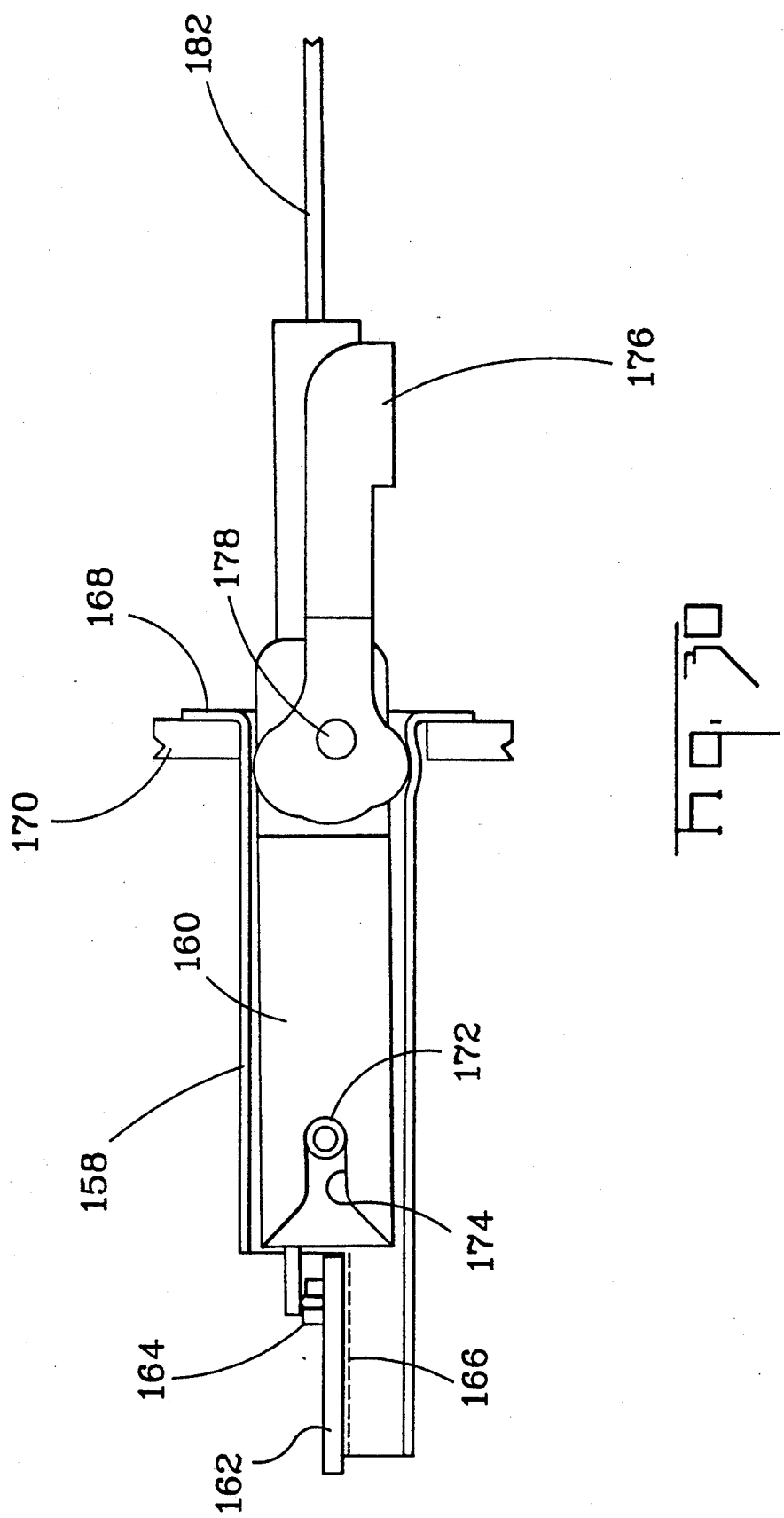

FIG. 27 shows a guide housing 158 made to cooperate with a coiled connector 160 which is to be docked to a printed circuit board 162. The compressible contact member 164 in this case is an elastomeric type produced by AMP Incorporated and known as AMPLIFLEX ®, but obviously, any type compressible member could be used.

Housing 158 has formed mounting ears 166 to attach to the circuit board 162 and on its opposite end, a mounting flange 168 for rigid mounting to a device housing 170. A fixed pivot pin 172 is formed inwardly from the sidewalls of housing 158 to cooperate with a guide slot 174 in connector 160 to provide the aforementioned up and down motion of the connector during docking. A camming lever 176 is used to provide the upward motion of that end of the connector (after the connector has been fully inserted) to cause electrical contact between the circuit board 162 and the inserted connector.

Figure 31:
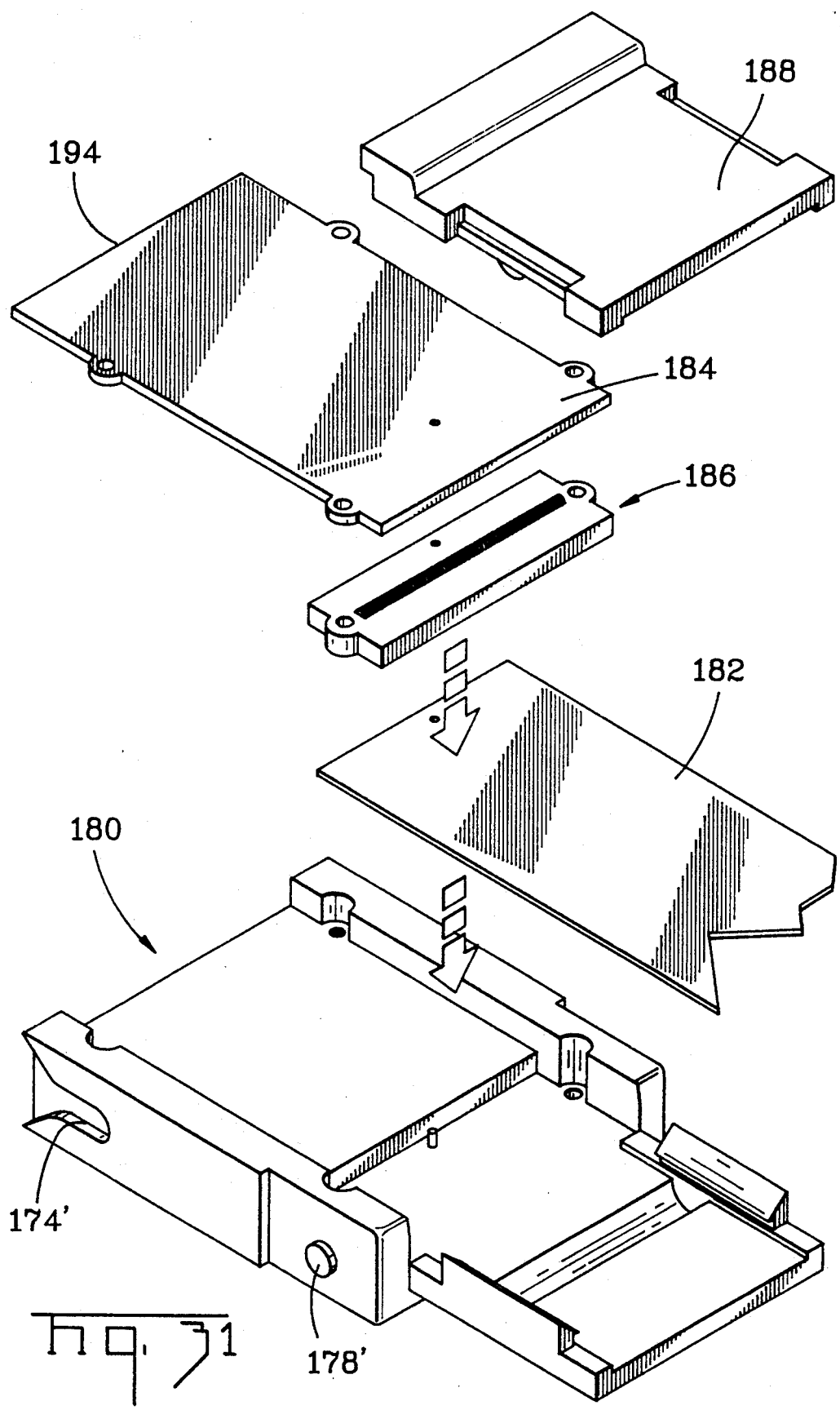
FIG. 31 is an isometric exploded view of a passive docking connector showing its construction.
Figure 32:
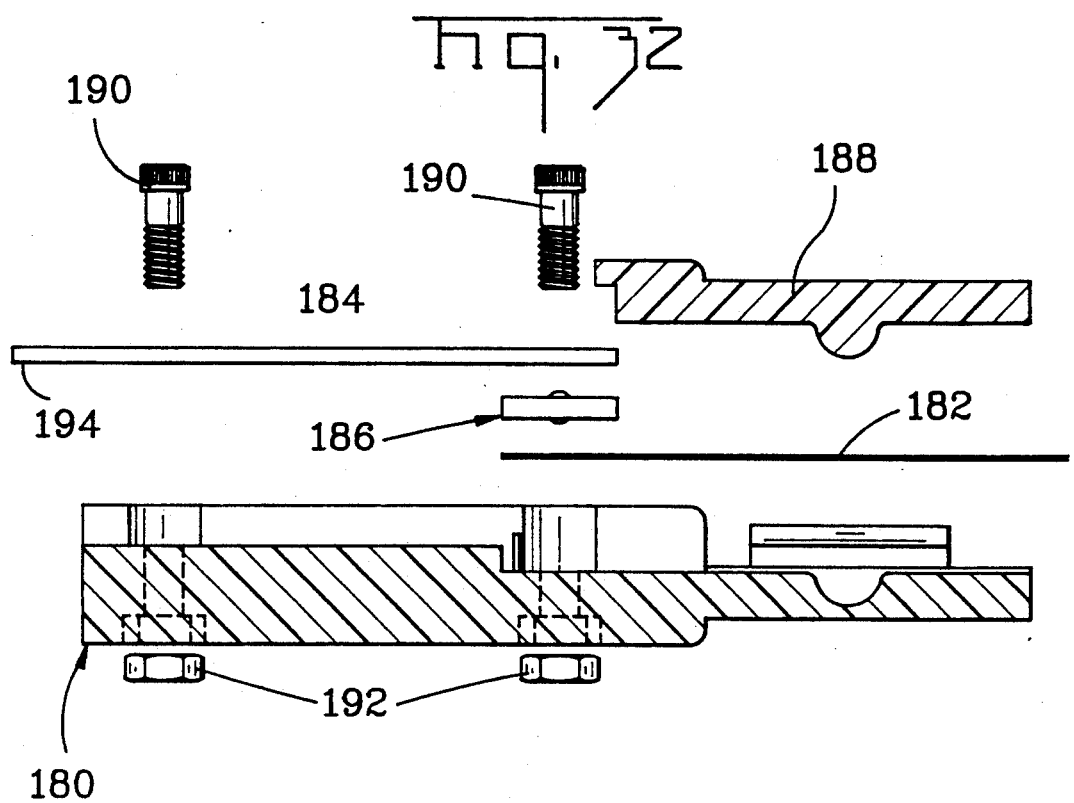
FIG. 32 is an exploded cross-sectional view through the device of FIG. 31.
Figure 33:
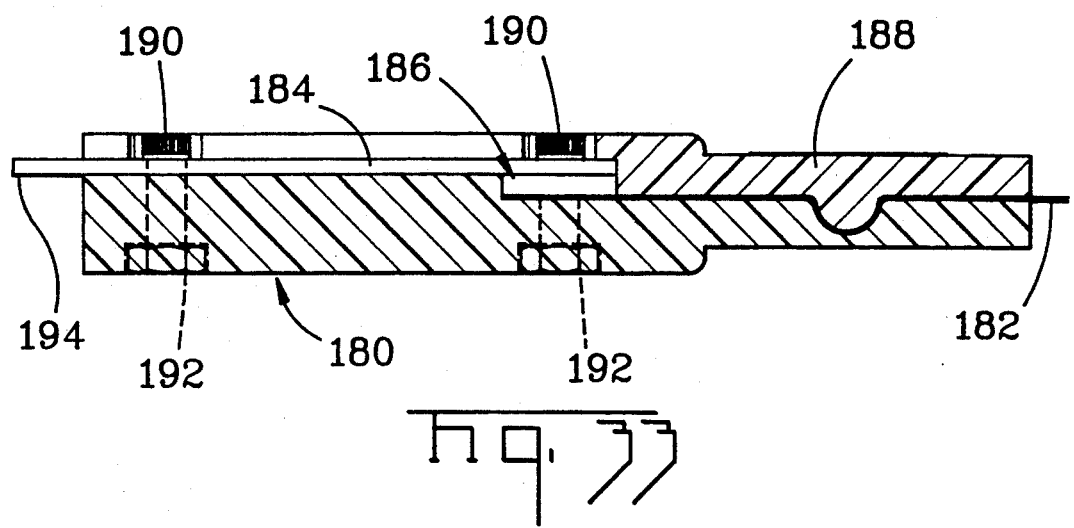
FIG. 33 is an assembled cross-sectional view of the components of FIG. 32.

FIGS. 31-33 illustrate the construction of a typical passive connector. A molded housing 180 has the outside profile described above and in this case is configured to receive a flat ribbon cable or flexible etched circuit 182 and to electrically connect said cable or circuit to a small printed circuit board 184 having standard circuit traces and pads on its underside. An elastomeric interface connector 18 is used to make this connection. A strain relief member 188 snap fits on the back end of housing 180 to retain the cable or circuit. Electrical connection of PCB 184 to cable or circuit 182 is effected when the assembly is bolted together with bolts 190 and nuts 192 as seen in FIGS. 32 and 33. It is to be understood that other types of compressible interfaces could also be used to serve the same function as member 186. As can be seen in these figures, PCB 184 has a forwardly extending portion 194 with circuit pads on its underside for mating in docking relationship with circuit board 162.

Figure 34:
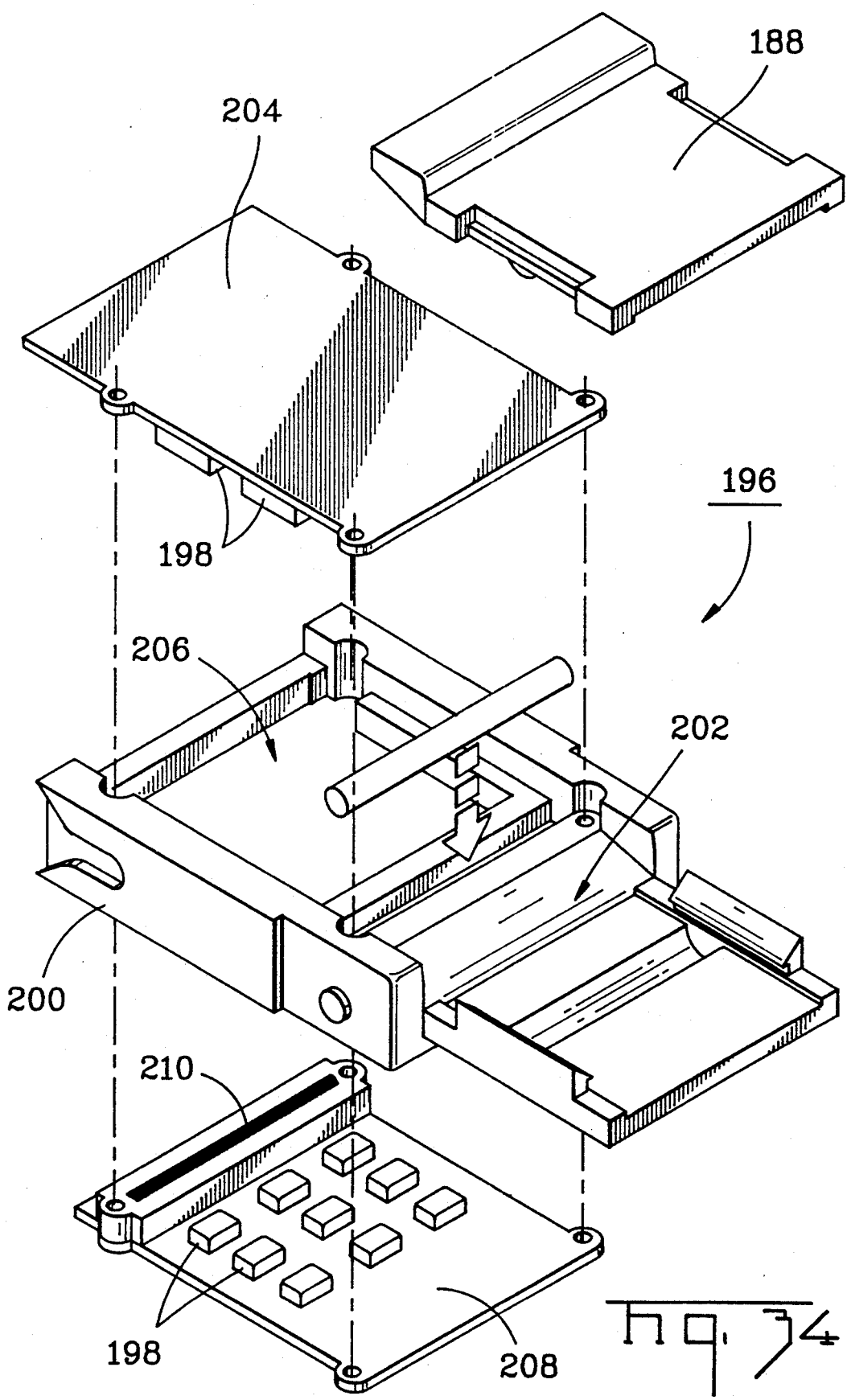
FIG. 34 is an exploded isometric view of a docking connector which carries active elements.

FIG. 34 illustrates the construction of a docking connector 196 made to carry active components 198 in addition to interconnecting the aforementioned cable or circuit 182. A housing 200 has an outward profile similar to that previously described and a cable receiving and retaining area 202 for termination of said cable or circuit to a PCB 204 which carries, in addition to its circuitry, active elements 198 on its underside. The housing 200 has an internal cavity 206 to receive said elements when the components are assembled. A second PCB 208 can also be employed on the opposite side of connector 200 if additional circuitry or components are needed. Interconnection of printed circuit boards 204 and 208 is accomplished through a compressible interface member 210. This type connector could be used to house a modem, for example, or any other desired circuitry.

The embodiments disclosed show typical uses for this invention but are not intended to limit the scope of the invention. The idea can be easily adapted by those skilled in the art to accomplish a zero insertion force docking connection between components.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A docking connector for providing an interface between a circuit board having a plurality of traces arranged along an edge, and a modular electrical component such as a disk drive having a plurality of contact terminals for completing a multiple-electrical-connection interface with said circuit board, said docking connector comprising:

a guide housing formed as an open-ended enclosure with a first end for slidable insertion of said modular component and a second end for slidable insertion of the edge of said circuit board, said guide housing further comprising interior alignment means for guiding insertion of said modular component such that said plurality of contact terminals are brought into a facing spaced-relation with said plurality of traces along said circuit board edge; and a camming assembly pivoted at the first end of said guide housing for manipulating said modular component to thereby bring said plurality of contact terminals into electrical contact with said plurality of traces along said circuit board edge, thereby completing an electrical interface between said circuit board and said modular component.

2. The docking connector according to claim 1, further comprising a protective cover pivoted upwardly of the second end of said guide housing and overlying said second end for protecting the interior of said guide housing in absence of said circuit board.

3. The docking connector according to claim 1, further comprising a pair of mounting ears projecting from said second end of said guide housing for anchoring said guide housing to a circuit board inserted therein.

4. The docking connector according to claim 2, wherein a projecting edge of said protective cover is angled outward from said guide housing to provide a blunted contact surface against said circuit board.

5. The docking connector according to claim 4, wherein said protective cover is provided with a strip of absorbent material adhered to said projecting edge to wipe clean said circuit board during insertion.

6. The docking connector according to claim 1, wherein said guide housing further comprises a top wall, opposing side walls, and a floor wall, and said interior alignment means further comprises an elongate indentation pressed inwardly of said guide housing across said floor wall to urge said modular component upwardly within said guide housing during insertion therein.

7. The docking connector according to claim 6, wherein said interior alignment means further comprises a compliant guide member formed in the top wall of said guide housing, said compliant guide member protruding inwardly of said guide housing to impart an opposing bias when said modular component is driven upwardly within said guide housing by said indentation during insertion.

8. The docking connector according to claim 7, wherein said camming assembly further comprises:

a camming member pivoted at the first end of said guide housing;

a door attached to said camming member to facilitate pivoting of said camming member, said door overlying said first end of said guide housing in a first position for protecting the interior of said guide housing, and said door being pivotable with said camming member to a second position wherein said first end of said guide housing is open to allow insertion of said modular component; and a lifter bracket suspended from said camming member for embracing said modular component when said modular component is inserted in said first end of said guide housing, said lifter bracket being operated by pivoting of said door and camming member into said second position to hoist an end of said modular component, thereby causing said modular component to pivot between said compliant guide member and indentation to bring said plurality of contact terminals into electrical contact with said plurality of traces along said circuit board edge.

9. The docking connector according to claim 6, further comprising a detent mounted on each of the opposing side walls of said guide housing for maintaining lateral alignment of said modular component therein.

10. The docking connector according to claim 1, wherein said modular component is provided with a guide channel extending lengthwise in each side thereof, said guide housing further comprising a top wall, opposing side walls, and a floor wall, and said interior alignment means further comprising a pair of opposing guide pins mounted on said side walls and projecting interiorly of said guide housing, whereby said guide pins are each received in a corresponding guide channel during insertion of said modular component in said guide housing to maintain alignment therein.

11. The docking connector according to claim 10, wherein said camming assembly further comprises:

a camming member having flanking support panels, said camming member being pivoted by said support panels at the first end of said guide housing;

a door attached to said camming member to facilitate pivoting of said camming member, said door overlying said first end of said guide housing in a first position for protecting the interior of said guide housing, and said door being pivotable with said camming member to a second position wherein said first end of said guide housing is opened to allow insertion of said modular component; and a pair of camming pins adjacent said side walls near the first end of said guide housing, said camming pins also being received in said corresponding guide channels during insertion of said modular component in said guide housing to maintain alignment therein, said camming pins each being driven by a corresponding one of said flanking support panels of said camming member when said door and camming member are pivoted into said second position to hoist an end of said modular component, thereby causing said modular component to pivot about said pair of guide pins to bring said plurality of contact terminals into electrical contact with said plurality of traces along said circuit board edge.

12. An interfacing connector for providing an electrical interface between a circuit board and a modular component such as a disk drive, said interfacing connector comprising:

a connector housing having a first ingress for insertion of a printed circuit board, a second ingress for coupling of a disk drive, and a transverse support shelf extending between said first ingress and second ingress;

a plurality of conductive terminals arranged within the second ingress of said connector housing along said shelf for completing a multiple-electrical-connection interface with said disk drive;

a plurality of canted coil springs arranged linearly within the first ingress of said connector housing at spaced intervals along an inner surface of said shelf, said canted coil springs each being connected to a corresponding one of said conductive terminals;

whereby said interfacing connector may be connected at said second ingress to said disk drive, and said circuit board may be inserted into said open first ingress of said connector housing along shelf to bring said canted coil springs into conductive contact at an appropriate point on said circuit board, thereby completing an electrical interface between said circuit board and said disk drive.

13. The interfacing connector according to claim 12, further comprising:

a plurality of contact pads linearly adhered to the first ingress of said connector housing at spaced intervals along an inner surface of said shelf, said contact pads each being connected to a corresponding one of said conductive terminals;

a flexible plate seated on said shelf at the first ingress of the connector housing and overlying said contact pads;

said plurality of canted coil springs being mounted linearly along said plate at spaced intervals corresponding to positions of said contact pads, whereby said canted coil springs are electrically connected with corresponding ones of said conductive terminals via contact at said contact pads.

14. The interfacing connector according to claim 13, wherein said shelf is provided with a plurality of mounting posts, and said flexible plate is provided with a corresponding number of holes in which said mounting posts may be inserted for aligning said plate on said shelf.

15. The interfacing connector according to claim 14, wherein said flexible plate is heat-staked to said connector housing by said mounting posts for anchoring said plate on said shelf.

16. The interfacing connector according to claim 13, wherein said shelf is formed with a plurality of channels interrupting a projecting face of shelf at the second ingress of the connector housing, and said plurality of conductive terminals are each inserted in a corresponding channel for completing a multiple-electrical-connection interface with said disk drive.

17. The interfacing connector according to claim 16, wherein said terminals are female socket terminals for receiving male connector pins of the disk drive.

18. The interfacing connector according to claim 13, wherein said connector housing is provided with mounting tabs extending toward the second ingress at each side of the connector housing, said tabs being spaced to embrace projecting edges of said disk drive, said tabs being perforated to allow fastening of the interfacing connector to said disk drive.

19. The interfacing connector according to claim 12, further comprising:

a cover support bracket integral to and extending perpendicularly from said connector housing;

an elongate cover for protecting said canted coil springs in absence of a circut board, said cover being pivotally connected to said support bracket, extending toward said canted coil springs and curving away therefrom to form an outward projection from said connector housing;

whereby a circuit board inserted between said cover and connector housing catches the outward projection of said cover and pivots said cover away from said canted coil springs.

20. The interfacing connector according to claim 19, wherein said elongate cover is spring-mounted at said support bracket to compress said circuit board against said canted coil springs.

21. The interfacing connector according to claim 12, further comprising:

an angled cover support bracket integral to and extending perpendicularly from said connector housing, said cover support bracket being angled to form a parallel extension spaced from said connector housing;

an elongate cover for protecting said canted coil springs in absence of a circuit board, said cover being pivotally connected to a tip of the support bracket extension, extending toward said canted coil springs and curving away therefrom to form a blunted pressure point;

whereby a circuit board inserted between said cover and connector housing bears against the blunted pressure point of said cover and pivots said cover inwardly away from said canted coil springs.

22. The interfacing connector according to claim 21, wherein said elongate cover is spring-mounted at said support bracket to compress said circuit board against said canted coil springs.

23. A contact array for a connector housing, comprising:

a thin flexible plate;

a plurality of canted coil springs mounted at spaced intervals along said flexible plate, said springs being coiled in a helix about an axis, and said springs being oriented such that said axis conforms to a plane of said flexible plate;

said flexible plate being anchored to said connector housing by a plurality of mounting posts extending therefrom, said mounting posts being heat-staked through a corresponding plurality of holes in said flexible plate;

whereby said canted coil springs are resiliently anchored to said connector housing for electrical contact with a facing circuit board.

* * * * *